(12) United States Patent
Stiansen et al.

(10) Patent No.: US 9,160,764 B2
(45) Date of Patent: *Oct. 13, 2015

(54) SYSTEMS AND METHODS FOR DYNAMIC PROTECTION FROM ELECTRONIC ATTACKS

(71) Applicant: Norse Corporation, Clayton, MO (US)

(72) Inventors: Tommy Stiansen, Dexter, NY (US);
Samuel M. Glines, St. Louis, MO (US);
Sheldon H. Foss, Jr., St. Peters, MO (US)

(73) Assignee: NORSE CORPORATION, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/224,822

(22) Filed: Mar. 25, 2014

(65) Prior Publication Data

US 2014/0366132 A1    Dec. 11, 2014

Related U.S. Application Data

(63) Continuation of application No. 13/550,354, filed on Jul. 16, 2012, now Pat. No. 8,726,379.

(60) Provisional application No. 61/508,493, filed on Jul. 15, 2011.

(51) Int. Cl.
*G06F 11/00* (2006.01)
*H04L 29/06* (2006.01)

(52) U.S. Cl.
CPC ........ *H04L 63/1441* (2013.01); *H04L 63/1491* (2013.01)

(58) Field of Classification Search
CPC ............ H04L 63/1416; H04L 63/1425; H04L 63/1433; H04L 63/1441; H04L 63/145; H04L 63/1475; H04L 63/1483; H04L 63/1491; H04L 63/20
USPC ............... 726/22–27; 709/223–225; 713/150, 713/152–154, 162; 705/64
See application file for complete search history.

(56) References Cited

U.S. PATENT DOCUMENTS

| | | | |
|---|---|---|---|
| 7,451,489 B2 | 11/2008 | Cantrell et al. | |
| 7,543,740 B2 | 6/2009 | Greene et al. | |
| 7,708,200 B2 | 5/2010 | Helsper et al. | |
| 7,823,202 B1 | 10/2010 | Nucci et al. | |
| 7,835,361 B1 | 11/2010 | Dubrovsky et al. | |
| 7,890,627 B1 | 2/2011 | Thomas | |
| 7,904,959 B2 | 3/2011 | Sidiroglou et al. | |
| 7,913,303 B1 | 3/2011 | Rouland et al. | |
| 7,937,480 B2 | 5/2011 | Alperovitch et al. | |
| 7,953,852 B2 | 5/2011 | Chandrashekar et al. | |
| 8,132,260 B1* | 3/2012 | Mayer et al. ................. | 726/25 |
| 8,201,257 B1* | 6/2012 | Andres et al. ................. | 726/25 |

(Continued)

OTHER PUBLICATIONS

Co-pending U.S. Appl. No. 14/632,514, filed Feb. 26, 2015.

(Continued)

*Primary Examiner* — Hosuk Song
(74) *Attorney, Agent, or Firm* — Wilson Sonsini Goodrich & Rosati

(57) ABSTRACT

Systems and methods for gathering, classifying, and evaluating real time security intelligence data concerning security threats presented by an IP address, and reporting in real time the degree and character of such security threats.

12 Claims, 17 Drawing Sheets

(56) References Cited

U.S. PATENT DOCUMENTS

| | | |
|---|---|---|
| 8,468,606 B2 * | 6/2013 | Van De Weyer et al. ....... 726/25 |
| 8,478,708 B1 | 7/2013 | Larcom |
| 8,533,844 B2 * | 9/2013 | Mahaffey et al. ............... 726/25 |
| 8,726,379 B1 * | 5/2014 | Stiansen et al. ................. 726/22 |
| 2008/0080518 A1 | 4/2008 | Hoeflin et al. |
| 2008/0262991 A1 | 10/2008 | Kapoor et al. |
| 2008/0307526 A1 | 12/2008 | Chung et al. |

OTHER PUBLICATIONS

Co-pending U.S. Appl. No. 29/519,137, filed Mar. 2, 2015.
U.S. Appl. No. 13/550,354 Office Action dated Oct. 25, 2013.
Co-pending U.S. Appl. No. 29/524,595, filed Apr. 21, 2015.
U.S. Appl. No. 14/632,514 Office Action dated Jul. 15, 2015.

* cited by examiner

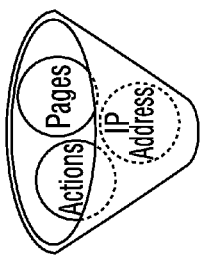

IP.V!k!ng e.g. "me" or "10.0.0.1/24"

Tracking 2,007,036, 151 IP's

Protocol Settings

| Protocol | |
|---|---|
| eDonkey User | Mule recruitment |
| Ares User | Narcotics Soliciting |
| Gnutella User | Pharmaceutical soliciting |
| IP unassigned | Industrial Espionage Server |
| IP unadvertised | Hacked Computer |
| TOR Exit | Pump and Dump User |
| IP based proxy | Short Scalping Computer |
| Botnet C&C | High Risk User TMI |
| Bot | |
| Carding user | |
| Carding Generator | |
| Financial Fraudster | |
| Finaicial publishing user | |
| Insider Information Leak | |
| Merchant Submitted fraud | |
| Intellidence collector | Overall Protocol |
| Identify Phishing | eDonkey User |
| Brute Force attacker | Ares |
| Cyber Stalker | Gnutella |
| Arms dealer site | Unassigned IP |
| | Unadvertised IP |
| | TOR Proxy |
| | IP Proxy |

Classification

IP.V!k!ng   e.g. "me"

Tracking 2,007,036, 151 IP's

Category Settings

This page allows to control witch categ factors.
To reset values to default click reset

| Category | |
|---|---|
| Child Pornography | Drugs |
| Bogon Unadv | Espionage |
| Bogon Unass | Music Piracy |
| Proxy | Games Piracy |
| Botnet | Movie Piracy |
| Financial | Publishing Piracy |
| Cyber Terrorism | StockMarket |
| Identify | Hacked |
| BruteForce | Information Piracy |
| Cyber Stalking | High Risk |
| Arms | HTTP |

FIG. 5A

| | Search |
|---|---|
| Botnet | |
| Botnet | |
| Carding | |
| Carding download | |
| Fraud | |
| financial piracy | |
| Financial Insider | |
| Merchants API | |
| Intelligence | |
| Identify Theft | |
| Cracking | |
| Cyber Stalking | |
| Arms Dealer | |
| Narcotics | |
| Narcotics | |
| Pharmaceutical | |
| Industrial Espionage | |
| Hacked | |
| Stock Scams | |
| Stock Scams | |
| High Risk User | |

| High risk Network | High risk Network | Job Search | jobsearch |
|---|---|---|---|
| High risk site | High risk Site | Tracker | tracker |
| Porn Content | porn | Models | models |
| Gambling | gamble | Forum | forum |
| Chat | chat | Web TV | webtv |
| Web Radio | webradio | Downloads | downloads |
| Webmall | webmall | Ring Tones | ringtones |
| Warez | warez | Search Engine | searchengines |
| Shopping | shopping | Social Net | socialnet |
| Advertisment | adv | Update Sites | updatesites |
| Movies | movies | Weapons | weapons |
| Violence | violence | Web Phone | webphone |
| Music | music | Religion | religion |
| Hacking | hacking | Image Hosting | imagehosting |
| ISP | isp | Podcast | podcasts |
| Drugs | drugs | Hospitals | hospitals |
| Aggressive | aggressive | Military | military |
| News | news | Politics | politics |
| Redirector | redirector | Remote Control | remotecontrol |
| Spyware | spyware | Fortine Telling | fortinetelling |
| Dating | dating | Library | library |
| Dynamic | dynamic | Cost Traps | costtraps |
| | | Homestyle | homestyle |
| | | Government | government |
| | | Alcohol | alcohol |
| | | Radio TV | radiotv |

FIG. 5B

- Agent Masking using proprietary protocols in the
- Appropriate geographical location relationship to target and
- Having the ability to communicate in multiple protocols

Attack Stages

Stage One

- Collection of Personal Identification Information (PII)

- Data collected includes information used for authentication purposes as well as financial account information Stage Two

- Sell or use PII data for economic gain. Sources used for the movement of PII data include:

○ IRC Chat Rooms
  ○ Dedicated Web Sites
  ○ Cyber Crime Hubs

FIG. 12C

SYSTEMS AND METHODS FOR DYNAMIC PROTECTION FROM ELECTRONIC ATTACKS

CROSS REFERENCE TO RELATED APPLICATIONS

This application is a Continuation of U.S. Utility patent application Ser. No. 13/550,354, filed Jul. 16, 2012, which issued as U.S. Pat. No. 8,726,379 on May 13, 2014, which in turn claims benefit of U.S. Provisional Patent Application No. 61/508,493 filed Jul. 15, 2011. The entire disclosure of both these documents is herein incorporated by reference.

BACKGROUND

1. Field of the Invention

This disclosure relates to the field of network security; specifically, the protection of computer systems and networks from electronic attack by detecting, classifying, and rating security threats presented by a given network connection in real time.

2. Description of the Related Art

Every computer connected to the Internet is connected in some fashion to every other computer connected to the Internet, and all of these computers are capable of communicating with each other through various layers of network communications protocols. These protocols differ wildly at the physical level, with some protocols communicating through changes in voltage across copper wires, others utilizing pulses of light across fiber optic cable, and still others using radio and microwave signals broadcast through the air.

However, the key to the Internet's success is the Internet Protocol—a routing and addressing protocol layered on top of the physical protocols and ignorant of the actual physical medium used. The Internet Protocol allows any one computer to find any other computer on the Internet by knowing only one thing about the remote computer: the Internet Protocol network address associated with that remote computer. This "IP Address" is a thirty-two bit binary number, commonly represented visually in "dotted-decimal" format for improved human-readability, such as: 150.50.10.34.

Each computer on the Internet generally must have a unique IP Address. When data packets are broadcast to the Internet identifying the IP Address of the intended recipient, devices with knowledge of network topography determine where to send the packets. When the destination machine receives the data packets, it verifies that the packet is intended for it by examining the destination IP Address stored in the Internet Protocol packet header, and disregards packets that are not intended for it. Further, the datagrams must also identify the IP Address of the sending computer so that the destination device knows where to send responses. IP Addresses are so fundamental to the Internet that even novice Internet users generally are aware of them.

Additional protocols are built on top of IP to improve the reliability of network communications, such as the Transmission Control Protocol ("TCP"). TCP handles the "session" between each endpoint of network communications, breaking large chunks of data into small datagrams and sending each datagram separately, reassembling the datagrams in proper order when they are received by the destination computer, and re-transmitting lost datagrams. TCP and IP are the workhorses of the Internet and, due to their complementary functions, are often referenced in concert as "TCP/IP," though they are technically distinct protocols.

Application protocols are then layered on top of TCP/IP to enable specific types of Internet communications. For example, the HyperText Transfer Protocol ("HTTP") is used by web browsers to exchange web page between web sites and web browsers. Other such protocols include the Simple Mail Transfer Protocol ("SMTP"), which is used to transfer one-to-one messages between Internet users, what is now known as "e-mail." Other venerable open protocols include FTP, IRC, IMCP, and SNMP. Newer protocols include peer-to-peer protocols and closed protocols, some of them layered on top of these and other open protocols. Network protocols are sometimes referred to as a "protocol stack" because each higher level protocol is generally independent of the protocols "beneath" it.

When these fundamental building blocks of the Internet were engineered, virtually all computers, people, and institutions with access to the Internet could be trusted to behave themselves. In its infancy, the Internet was used almost exclusively by academics at major research institutions, the government, a handful of private corporations, and a very small number of individual users with benign intentions. The engineering goal of the Internet was physical security, not data security, and the system was designed to survive disruptions caused by damage to physical components, such as by acts of warfare or terrorism. As such, little attention was paid to data security threats originating within the network, and the protocols do not capture much information that can be used to identify nefarious individuals or malicious data. For example, TCP/IP captures little identifying information beyond the source and destination IP Addresses. Similarly, the designers of protocols such as SMTP, FTP, and IRC had little reason to include any form of source verification. For example, SMTP simply assumes that the sender of an e-mail is who the sender claims to be. The designers of newer protocols, notably peer-to-peer file sharing protocols, specifically engineered them to protect anonymity and frustrate attempts to identify the user.

When the Internet was commercialized during the tech bubble of the 1990s, the open nature of Internet's basic protocols was abused to flood the Internet with unwanted traffic. For example, the scourge of the 1990s was unsolicited junk e-mail known as "spam," which was blasted through open relays on the Internet which blindly and obediently forwarded SMTP traffic as they always had, creating a substantial industry in highly sophisticated spam-detection and spam-blocking software solutions. Because the authenticity of the sender is nearly impossible to validate, spam solutions generally examine the content of the e-mail to determine whether to categorize it as spam.

While spam is annoying, compared to modern threats to data security, spam now appears in hindsight like the quaint troubles of a bygone era of naiveté. An enormous amount of money now is exchanged across the world in on-line financial transactions, ranging from ordinary consumer purchases, to sales of securities, to interbank and intergovernmental transfers. Individuals also exchange private, personal information such as social security numbers, dates of birth, photos of their families, addresses and phone numbers, insurance information, credit card numbers, and bank information. Lawyers and doctors send their clients confidential and privileged information; corporate board members, government agencies, and military personnel exchange messages and documents regarding strategies and secret new projects. All of this activity takes place on top of the open TCP/IP protocols, protected only by additional security layered on top of these basic building blocks.

The opportunity for malefactors to interject themselves into the stream of on-line activity and create havoc is manifest, and the modern threats to data and network security are myriad and include: fraud, theft, corporate and sovereign espionage, hacking, virus distribution, smuggling, child pornography, drug sales, conspiracy, organized crime, terrorism, and other behaviors injurious to nations, firms, and individuals. The threat is exacerbated by the fact that sophisticated malefactors manipulate the open structure of the Internet to hide their activities. After all, law enforcement and cybersecurity personnel have only an IP Address at their disposal to identify the source of malicious data.

However, even that limited amount of information—an IP Address—assumes that the malefactor is carrying out an attack or fraudulent transaction from his own computer. In the modern day, sophisticated security threats also come in the form of "bots"—intelligent software planted on otherwise innocuous networked computers and commandeered by the malefactor without the knowledge of the infected computer's operator. The wrongdoer plants these bots on a remote machine using "Trojan horse" techniques—sneaking the malicious software past technological security, such as by taking advantage of unpatched security flaws in operating systems, and past human vigilance, such as disguising the program as a legitimate download or burying malicious code in a funny video. The infected computer then becomes a "zombie" under the wrongdoer's control, and the wrongdoer directs the zombie to carry out attacks or fraudulent transactions, thus removing the true source of the attack from the apparent source of the attack by another degree of separation and further frustrating attempts to identify and stop the malefactor.

In addition to obscuring the true source of the malicious behavior, bots also allow malefactors to carry out attacks not otherwise possible on the shoestring budget of a cybercriminal. For example, governments and large corporations usually have substantial bandwidth available to handle Internet traffic and use sophisticated load balancers to route incoming traffic to idle resources which can promptly service the connection. No one individual computer on commodity hardware has the horsepower to take down this kind of corporate network. However, the wrongdoer can utilize a "bot herder" program to organize millions of zombies into a "botnet" and coordinate a simultaneous distributed attack on a single system. The botnet floods the victim network with traffic that appears innocent but quickly brings the system to its knees, causing legitimate users to receive a "timeout" message stating that the web site is too busy to serve them. This type of attack is known as Distributed Denial of Service ("DDoS") attack.

While a DDoS attack is frustrating to the business, major DDoS attacks are easy to spot once they begin and the victim corporation simply issues a press release informing the public of why the website is not available. Antivirus solutions for the infected zombie computers are usually developed quickly and enough of the bots are disabled to reduce the DDoS traffic to a manageable volume. Consequently, even a highly sophisticated DDoS attack is rarely successful for more than a few days, and often no more than a few hours, resulting in some interruption of normal business operations with only modest financial damage.

However, zombies and botnets can also be leveraged to carry out more nefarious activities carrying a higher price tag for the individual user than merely not being able to reach a favorite web site. The bot software residing on the infected computer may collect personally identifying information, such as by monitoring the keystrokes of the user and recognizing common patterns of potentially useful information such as social security numbers, phone numbers, credit card numbers, bank account numbers, addresses, dates of birth, and passwords. The zombie forwards this information to the bot herder, which redistributes the information to other bots to carry out fraudulent transactions. The zombies can work in concert to defraud a single user, but are usually more effective if each zombie acts individually by emulating an individual, specific person. Using the gathered personally identifying information, the zombies connect to commercial websites, such as banks and retailers, to withdraw or transfer money, or purchase goods or services.

The amount of damage a sophisticated botnet can inflict increases with the price performance of commodity hardware. A graphics card in a high-end gaming computer today has more processing power than an entire server farm only a decade ago and costs only a few hundred dollars. The wide variety of methods, techniques, and sources for malware attacks creates the need to develop and deploy equally flexible, adaptive, and sophisticated countermeasures. Unfortunately, the breadth and depth of these threats is such that countermeasures tend to be complex, cumbersome, expensive, and intrusive upon legitimate use, pushing unto innocent users too much of the burden of dealing with bad actors.

Further, modern countermeasures are, at best, only partially successful. Because the only identifying information typically available for any given packet of network information is the IP Address, countermeasures focus on examining the payload to determine the threat profile it presents, if any. However, because the actual data transmitted over TCP is broken into separate datagrams which may arrive out of sequence, the payload often cannot be examined and analyzed until it has been received, at which point it already presents a threat. This means that a requested transaction or connection from a client must be accepted, and the data transmitted from that client must be accepted, before the threat can be identified and countermeasures can be marshaled. By then, it may be too late.

One way around this is to maintain "blacklists" of IP Addresses known to be malicious. This technique has been used on peer-to-peer ("P2P") networks to identify "polluters" who intentionally distribute bad data to frustrate the efficacy of P2P networks. Known polluters are identified in a blacklist, and P2P clients are programmed to check new connections against the blacklist and ignore connections from known polluters.

However, IP Addresses are no longer static. Innovations such as the Dynamic Host Configuration Protocol ("DHCP") allow routers to autonomously assign IP Addresses to computers within that router's subnet, effectively creating self-configuring sub-networks that require little maintenance or attention. As mobile device use becomes more prolific, the one-to-one relationship between an IP Address and a particular device is being eroded. For example, when an iPhone is within range of a wireless network and joins it, the device receives a new IP Address on the subnet. When the iPhone's owner wanders away, that IP Address is recycled and assigned to another device, and when the iPhone user stops at another location, the iPhone will receive a new IP Address on another subnet. Even the WAN IP Address for a home cable Internet connection changes over time and with it, the IP Addresses for all computers on the private home network. Thus, it's not enough to blacklist a given IP Address; countermeasures must also be able to remove IP Addresses from the blacklist as they are recycled and assigned to new users presenting no threat or risk. Blacklists are also insufficient because an IP Address that presents a risk for one type of transaction may present no risk at all for another type of transaction.

Tracking the ebb and flow of IP Addresses is made even more difficult because of the size of the addressing space. As mentioned, an IP Address is a thirty-two bit binary number, meaning there are theoretically more than four billion possible IP Addresses. About three billion are assigned at any given time. The use of home routers to create private networks also hides additional computers behind a single address, meaning that a single IP Address assigned to a cable subscriber may actually represent transactions from multiple computers accessing the Internet through a shared gateway, some of which may be malicious, and others of which may not. This presents a serious processing bottleneck. Further, the four billion possible IP Addresses pertains to version four of the Internet Protocol, but in version six, the IP Address is a 128-bit number allowing for not only trillions of IP Addresses, but trillions of trillions of trillions.

Consequently, current threat mitigation systems do not focus on identifying malicious IP Addresses, but instead narrowly define potential threat factors based on the payload sent. That is, existing systems do not determine whether a particular IP Address presents a threat, but instead whether the particular payload or transaction for that IP Address is malicious. Examining a payload can sometimes provide a proxy for detecting a criminal, and if the payload cannot be delivered, the criminal activity cannot be carried out. However, the sophistication and signature of attacks changes rapidly, and firms providing malware protection services struggle to keep up with the speed and flexibility of these programs. Further exacerbating the situation, it can be difficult to anticipate the new ways in which payloads can be hidden or disguised, and existing solutions to malware are thus generally reactive, rather than proactive.

SUMMARY

The following is a summary of the invention which should provide to the reader a basic understanding of some aspects of the invention. This summary is not intended to identify critical components of the invention, nor in any way to delineate the scope of the invention. The sole purpose of the summary is to provide in simplified language some aspects of the invention as a prelude to the more detailed description represented below.

Because of these and other problems in the art, described herein, among other things, are systems and methods directed toward the provisioning of actionable real time security intelligence data concerning the nature and degree of on-line security threat presented by an IP Address at a point in time.

Described herein, among other things, is a system for reducing the security risk of transactions with a computer over a computer network comprising: a computer network; a first computer on the computer network having a first computer network address and communicating with a second computer on the computer network; a communication between said first computer and said second computer being indicative of a user of the first computer being engaged in a risk activity and including the first computer network address; a monitoring system on the computer network having one or more monitoring agents autonomously obtaining the first computer network address from the communication; one or more algorithms assigning a risk score to transactions over the computer network from the first computer network address, the risk based at least in part on the communication; wherein the monitoring system utilizes the risk score to inhibit a communication between the first computer and a third computer.

In an embodiment, the computer network is the Internet.

In an embodiment, the first computer network addresses is an Internet Protocol address.

In an embodiment, one or more of the monitoring agents is selected from the group consisting of: a bot; a daemon; a terminate-and-stay-resident program; a honeypot; a computer; a virtual computer; a network device; a virtual network device; a spider; a P2P networking client; a P2P networking server; a packet filter; a packet sniffer; a firewall; a chat client; a chat server; a file transfer client; a file transfer server; a newsgroup reader; a newsgroup server provider; a file sharing client; a file sharing server; a web server; a web site; a web page; a translation program; a genetic algorithm; a learning algorithm; a self-replicating program; a worm; a Trojan horse.

In an embodiment, one or more of the algorithms is selected from the group consisting of: pattern recognition; inferential algorithm; planning algorithm; heuristic algorithm; logical algorithm; search algorithm; decision tree algorithm; red-black tree algorithm; Levensthein algorithm; CacheHill algorithm; PCRE algorithm; Oliver decision graph algorithm; genetic algorithm; learning algorithm; self-teaching algorithm; self-modifying algorithm.

In an embodiment, one or more of the risk activities is selected from the group consisting of: fraud; identify theft; crime; cyberbullying; denial-of-service; hacking; virus authoring or distribution; exploit authoring or distribution; digital piracy; intellectual property infringement; pornography production or distribution; controlled substance trade; terrorism; insurrection; smuggling; organized crime; civil disobedience; money laundering.

In an embodiment, the risk score is provided through an application programming interface.

In an embodiment, the risk score is in the value range 0 to 100 inclusive.

Also described herein, among other things, is a method for reducing the security risk of transactions with a computer over a computer network comprising: providing a computer network; providing a first computer on the computer network having a first computer network address and communicating with a second computer on the computer network; providing a communication between the first computer and the second computer including the first computer network address and the communication being indicative of a user of the first computer being engaged in a risk activity; obtaining the first computer network address from the communication; assigning a risk score to the first computer network address based at least in part on the communication; transmitting the risk score over the computer network to a third computer communicating with the first computer over the computer network; inhibiting communication between the first computer and the third computer; reducing the security risk of transactions with the first computer over the computer network.

In an embodiment, the computer network is the Internet.

In an embodiment, the first computer network addresses is an Internet Protocol address.

In an embodiment, the risk activity is selected from the group consisting of: commercial risk; fraud risk; identify theft risk; criminal risk; social risk; denial-of-service risk; hacking risk; virus risk; exploit risk; infringement risk; pornography risk; drug risk; terrorism risk.

In an embodiment, the risk score is provided autonomously through an application programming interface.

In an embodiment, the risk score is in the value range 0 to 100 inclusive.

BRIEF DESCRIPTION OF THE DRAWINGS

FIGS. 5A and 5B provide an example of a classification format that may be used in an embodiment for rating different IP Addresses.

FIGS. 12A-12C provide a conceptual diagram about how personal data is moved.

DESCRIPTION OF THE PREFERRED EMBODIMENTS

Figure 1:
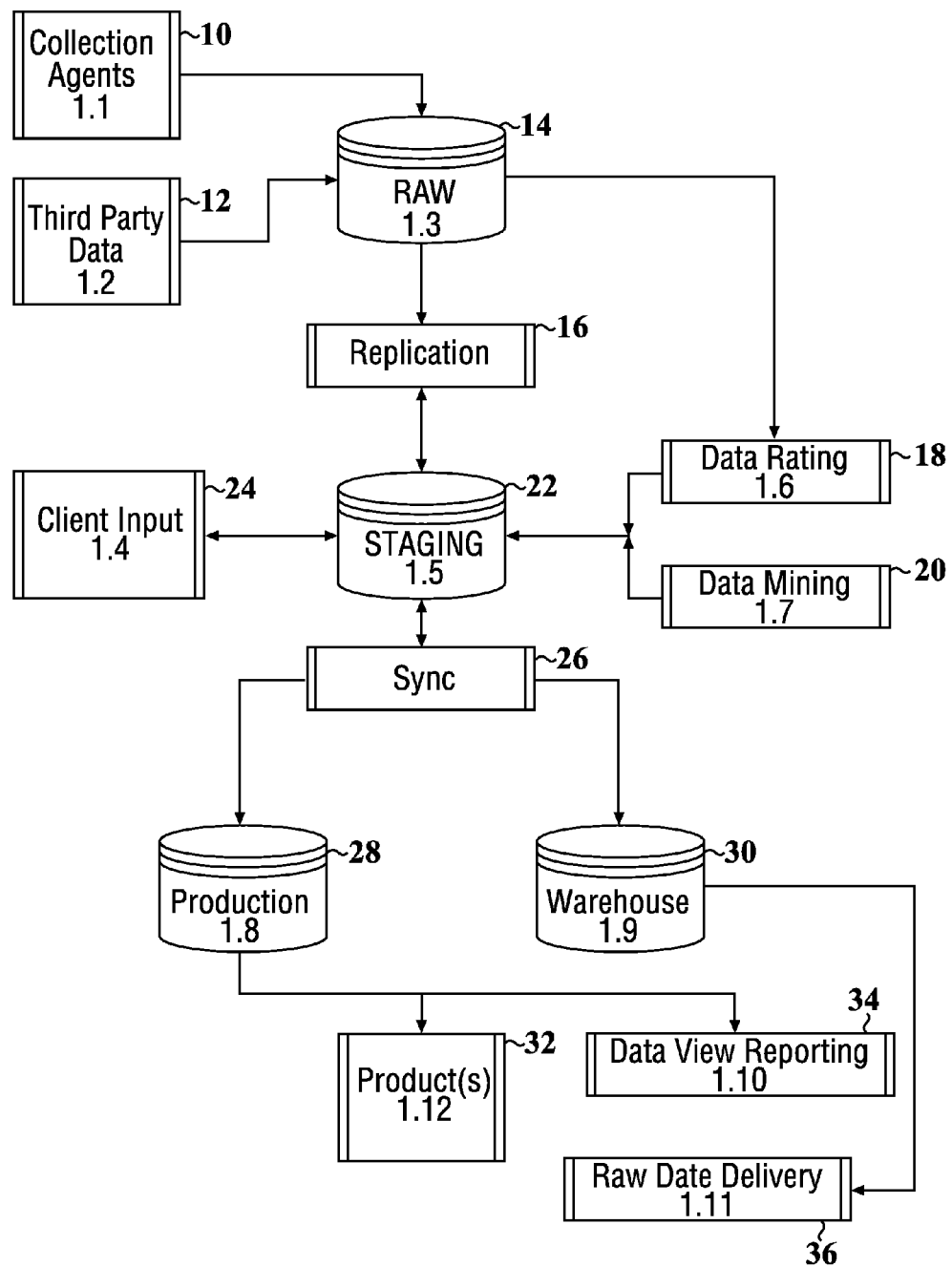
FIG. 1 provides a diagram of the architectural logic of an embodiment of a system for detecting and classifying Internet protocol addresses which may be used maliciously.

Throughout this disclosure the term "computer" describes hardware which generally implements functionality provided by digital computing technology, particularly computing functionality associated with microprocessors. The term "computer" is not intended to be limited to any specific type of computing device, but it is intended to be inclusive of all computational devices including, but not limited to: processing devices, microprocessors, personal computers, desktop computers, laptop computers, workstations, terminals, servers, clients, portable computers, handheld computers, smart phones, tablet computers, mobile devices, server farms, hardware appliances, minicomputers, and mainframe computers.

As used herein, a "computer" is necessarily an abstraction of the functionality provided by a single computer device outfitted with the hardware and accessories typical of computers in a particular role. By way of example and not limitation, the term "computer" in reference to a laptop computer would be understood by one of ordinary skill in the art to include the functionality provided by pointer-based input devices, such as a mouse or track pad, whereas the term "computer" used in reference to an enterprise-class server would be understood by one of ordinary skill in the art to include the functionality provided by redundant systems, such as RAID drives and dual power supplies.

It is also well known to those of ordinary skill in the art that the functionality of a single computer may be distributed across a number of individual machines. This distribution may be functional, as where specific machines perform specific tasks; or, balanced, as where each machine is capable of performing most or all functions of any other machine and is assigned tasks based on its available resources at a point in time. Thus, the term "computer," as used herein, can refer to a single, standalone, self-contained device or to a plurality of machines working together or independently, including without limitation: a network server farm, "cloud" computing system, software-as-a-service, or other distributed or collaborative computer networks.

Those of ordinary skill in the art also appreciate that some devices which are not conventionally thought of as "computers" nevertheless exhibit the characteristics of a "computer" in certain contexts. Where such a device is performing the functions of a "computer" as described herein, the term "computer" includes such devices to that extent. Devices of this type include but are not limited to: network hardware, print servers, file servers, NAS and SAN, load balancers, and any other hardware capable of interacting with the systems and methods described herein in the matter of a conventional "computer."

Throughout this disclosure, the term "software" refers to code objects, program logic, command structures, data structures and definitions, source code, executable binary files, object code, compiled libraries, implementations, algorithms, or any instruction or set of instructions capable of being executed by a computer processor, or capable of being converted into a form capable of being executed by a computer processor, including without limitation virtual processors, or by the use of run-time environments or virtual machines. Those of ordinary skill in the art recognize that software can be wired directly onto hardware, including without limitation onto a microchip, and still be considered "software" within the meaning of this disclosure. For purposes of this disclosure, software includes without limitation: instructions stored or storable in RAM, ROM, flash memory BIOS, CMOS, mother and daughter board circuitry, hardware controllers, USB controllers or hosts, peripheral devices and controllers, video cards, audio controllers, network cards, Bluetooth and other wireless communication devices, virtual memory, storage devices and associated controllers, firmware, and device drivers.

Throughout this disclosure, the term "Internet" refers to the public Internet offering network interconnectivity to other computer networks, including other internets. This definition includes not only the public components of the Internet but all devices communicating or capable of communicating through the Internet and the various protocols used to communicate through the Internet. Although this disclosure specifically references the Internet Protocol as discussed above, any protocol used for addressing and routing data through an internet, or the Internet, is contemplated.

Throughout this disclosure, the term "IP Address" generally refers to the network address or addresses associated with an endpoint for network communications as stored in the header data of an Internet Protocol packet. Those of ordinary skill in art know that the proliferation of private networks and Network Address Translation ("NAT") techniques creates ambiguity with respect to the meaning of IP Address because a device on a private network may be assigned one IP Address by the edge router for its subnet yet appear to devices outside of the private network to have a different IP Address, such as the IP Address of the edge router itself. For purposes of this disclosure, IP Address of a device generally refers to the IP Address of the device as it appears to other devices not located on the same subnet as the device.

Throughout this disclosure, the term "real time" refers to software operating within operational deadlines for a given event to commence or complete, or for a given module, software, or system to respond. Those of ordinary skill in the art understand that "real time" does not literally mean the system processes input and/or responds instantaneously, but rather that the system processes and/or responds rapidly enough that the processing or response time is within the general human perception of the passage of real time in the operational context of the program. Those of ordinary skill in the art understand that where the operational context is a graphical user interface, "real time" normally implies a response time of less than one second of real time, and preferably milliseconds or microseconds of real time. However, those of ordinary skill in the art also understand that under other operational contexts, a system operating in "real time" may exhibit delays longer than one second.

Although the present invention is described with particular reference to the accompanying drawings, it is to be understood at the outset that it is contemplated that the present invention may vary in specific detail from that illustrated and described herein while still achieving the desirable characteristics and features of the present invention. Accordingly, the description that follows is intended to be understood as a broad enabling disclosure directed to persons skilled in the applicable arts, and is not to be understood as being restrictive.

Figure 11:
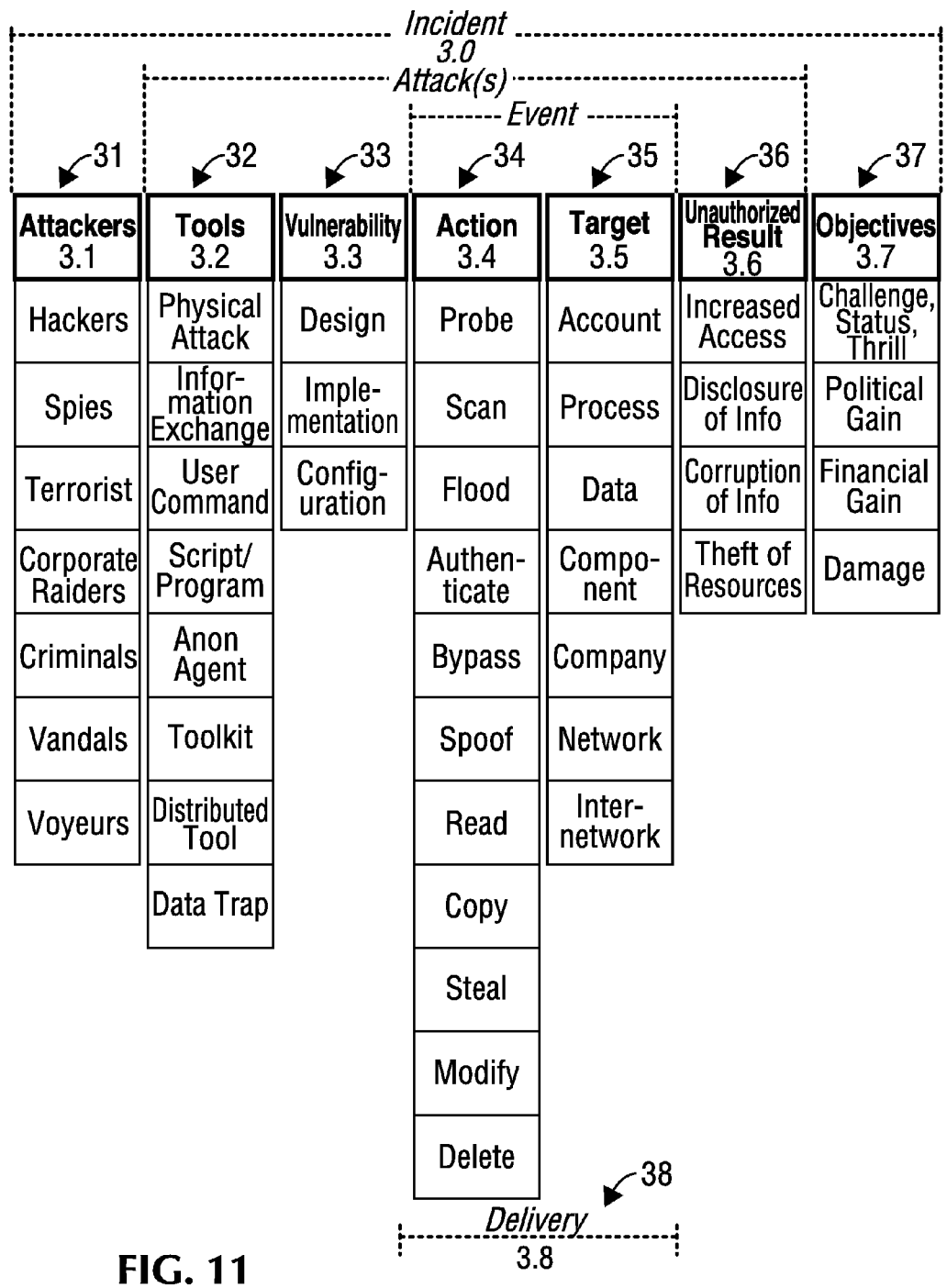
FIG. 11 provides a diagram showing a spectrum of Internet-based threat factors.

Those of ordinary skill in the art recognize that security threats over a computer network come in a limitless variety of forms, and new types of threats are generated constantly, and other threats may fade from public concern. Certain types of threats are more prevalent on specific operating systems than others. As depicted in FIG. 11, security threats and attacks generally consist of an attacker (31) using tools (32) to exploit a vulnerability (33) to take certain actions (34) against a target (35), achieving an unauthorized result (36) that accomplishes an objective (37). For example, a low-grade hacker (31), sometimes colloquially called a "script kiddie," may use a port-scanner (32) and rootkit (32) to exploit configuration (33) vulnerabilities in a web server (35). If successful, the hacker (31) is authenticated (34) as a superuser and uses the compromised machine (35) to carry out further attacks, such as scans (34) of other networks (35) to search for vulnerable targets (35), to which the hacker (31) may also attempt to gain access for purposes of destroying information (36) to impress his peers (37).

As shown in FIG. 11, there is a broad spectrum of factors making up any given threat, and thwarting any given attack is difficult because of all the variables involved. For example, thwarting a script kiddie (31) running a port scanner (32) may require the pre-emptive use of a firewall or packet filter which intercepts ICMP packets, but thwarting a sophisticated hacker (31) attempting a brute-force password crack (32) with an octopus bot (32) may require a different type of defense. Due to the enormous variety in attack vectors, it is difficult and expensive for an enterprise to protect itself from all possible threats without seriously crippling legitimate network operations as well. However, all of these threats share a unifying characteristic: the user (31) must access the Internet to carry out these attacks, which means the user (31) must operate over the Internet protocol, which in turn means the user's (31) device must have an IP Address and communications to and from that device must include the IP Address.

In an embodiment, the systems and methods described herein identify an IP Addresses suspected of being engaged in a risk activity. In an embodiment, the systems and methods described herein classify the nature, probability, and/or severity of that risk activity. In an embodiment, the systems and methods described herein provide data and/or reports including the IP Address, risk activity, and/or risk score for that risk activity. A consumer may make a business decision on whether and how to interact with that IP Address based on the data and/or reports.

In the embodiment depicted in FIG. 1, a collection agent (10) identifies IP Address suspected of being engaged in a risk activity. IP Addresses are generally contained within an addressing space defined by a protocol specification. In an embodiment, this addressing space is the space of, or a subspace of, the IP Addresses allowed by the specification for the Internet Protocol, version four ("IPv4"). In an embodiment, this addressing space is the space of, or a subspace of, the IP Addresses allowed by the specification for the Internet Protocol, version six ("IPv6"). In another embodiment, this address space includes IP Addresses occurring on the computer network whether or not the IP Addresses are allowed by the applicable protocol specification. In an embodiment, this addressing space is the space of, or a subspace of, another protocol suitable for routing data through an internet, whether or not such protocol presently exists or is in the future developed.

While the term "IP Address" is used herein in reference to protocols presently implemented on the public Internet, any addressing mechanism and/or protocol suitable for identifying the endpoints of computer network communications and routing data between and among such endpoints is contemplated. In an embodiment, all IP Addresses in the addressing space are evaluated, but in another embodiment, a subset of the IP Addresses is evaluated.

There may be one or more collection agents (10). In an embodiment, a plurality of collection agents (10) works independently and/or in concert. The number of autonomous collection agents (10) which work together will necessarily depend upon the type of data gathered by those collection agents (10). By way of example and not limitation, a number of collection agents (10) working in concert may participate in peer-to-peer network communications to provide actionable intelligence data about IP Addresses involved in those peer-to-peer network transmissions. In an embodiment, there are at least 100 collection agents (10). In a further embodiment, there are at least 1,000 collection agents (10). In a still further embodiment, there are at least 10,000 collection agents (10). In a still further embodiment, there are at least 100,000 collection agents (10). In a still further embodiment, there are at least 1,000,000 collection agents (10). Collection agents (10) may be software, hardware, or software in combination with hardware.

In the depicted embodiment of FIG. 1, one or more collection agents (10) identify a suspicious IP Address and gather data about the type of activity in which communications to and from that IP Address are involved. This intelligence may be supplemented by third party data (12). Collection agents (10) are generally autonomous or semi-autonomous software having artificial intelligence to identify an IP Address which may be engaged in a risk activity. In an embodiment, a collection agent (10) examines network traffic to identify indicative security risk data associated with an IP Address. For example, a collection agent (10) may monitor network activity, participate in certain types of network communications, or act as an Internet server or client. In an embodiment, a collection agent (10) attempts to communicate directly with a target IP Address. In an embodiment, a plurality of collection agents (10) act as a monitoring system.

Figure 9:
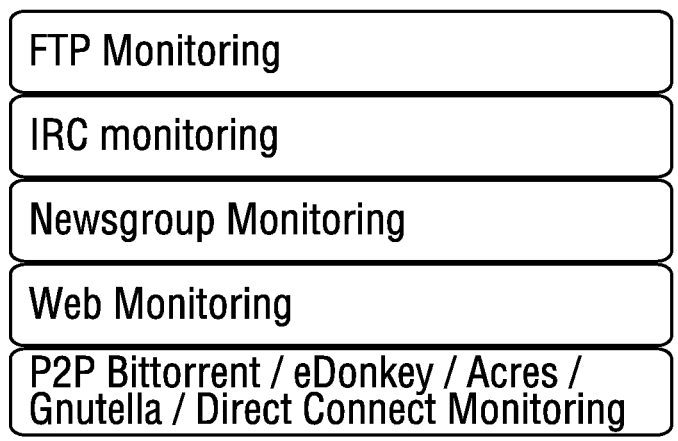
FIG. 9 provides a conceptual diagram of agent monitoring modules in an embodiment.

In an embodiment, a collection agent (10) identifies a suspicious IP Address by recording the IP Address of clients connected or transmitting packets through network servers and network services. These network servers may be hardware or software. The services which a collection agent (10)

may monitor include those depicted in FIG. 9, as well as, without limitation: echo servers, daytime servers, netstat servers, quote servers, FTP servers, telnet servers, secure shell and other encrypted connection servers including without limitation servers implementing the SSL protocol, mail and associated servers including POP and IMAP and Exchange servers, SMTP servers, ICP servers, RLP servers, ARPA or WINS servers, WHOIS and NSLOOKUP servers, DNS servers, Usenet and newsgroup servers or services, BOOTP servers, DHCP servers, Gopher servers, HTTP servers, authentication servers, address and protocol translation servers, ident servers, database servers including but not limited to SQL database servers, SGMP servers, SNMP servers, graphical user interface servers including but not limited to X Servers, BGP servers, IRC servers, IPX servers, BGMP servers, LDAP servers, SLP servers, syslog servers, routing and network intelligence servers, instant messaging servers, tunneling servers, RPC servers, synchronization and coordination protocols including rsync, file system protocols including but not limited to NFS, file exchange and transfer servers including without limitation P2P networking systems.

It should be noted that new protocols and servers are constantly introduced and deprecated, and it is impossible to list all possible network servers, services, systems, and/or protocols through which a collection agent (10) may collect IP Addresses and/or other risk data pertaining to an IP Address. It is specifically contemplated that a collection agent (10) may identify suspicious IP Addresses through network servers not currently in existence or use. The network servers may run on any hardware or operating system, including without limitation Windows, Mac OS, Unix, Linux, and minicomputer and/or mainframe operating systems. The network servers may be open, closed, public, private, or any combination thereof. In an embodiment, a collection agent (10) is a network server. In another embodiment, a collection agent (10) is a network client. In an embodiment, a collection agent (10) monitors a network server, which may or may not also be a collection agent (10).

In an embodiment, a collection agent (10) gathers information by examining a file. A "file" may be a file stored on physical media, or a stream of related data whether or not stored. For example, a YouTube video is a "file" although the viewer may view the video in a streaming format without storing a copy. In an embodiment, a collection agent (10) gathers information about a file located on or transferred over a network. The mechanism for storage or transfer may be any one of the servers, systems, services, or protocols described herein, or any other server, service, system, or protocol suitable for file transfer or storage over the Internet. By way of example and not limitation, these may include FTP, P2P, web sites, mobile device applications, instant messaging clients, social networking tools, and future technological developments performing, facilitating, or allowing file transfer and/or storage over a network.

In an embodiment, a collection agent (10) gathers information about the file content, including without limitation by: examining some or all the data comprising the file content; examining some or all of the file metadata associated with the file; examining some or all of the file system or operating system metadata associated with the file; examining some or all of the hardware metadata associated with the file; examining a checksum or digest of the file.

In an embodiment, a collection agent (10) collects information about file metadata, including without limitation: filename; file size; file format; file checksum or digest; file extension; creation date/time; creation user; last modified date/time; last modified user; file path or network location; dimensional information, including without limitation resolution and pixel depth of images or videos; duration of audio and video recordings; encoding and/or compression mechanisms or formats; source library; user-defined metadata tags; transcripts; embedded descriptions; copyright and other authorship and/or attribution data; source, including without limitation type of hardware used to create, edit, or record multimedia content; access permissions; last access date/time; last access user; confidentiality information; technical metadata; business metadata; process metadata; identity metadata; legal metadata; DRM metadata; source, destination, or transmittal/broadcast metadata; database metadata; storage metadata. In an embodiment, a collection agent (10) computes or causes another process or element, which may or may not be an element of present invention, to compute a checksum or digest of the content.

In an embodiment, a collection agent (10) gathers information about an IP Address by monitoring and/or analyzer natural language communications to or from that IP Address. By way of example and not limitation, a collection agent (10) may examine the content of messages on chat servers, instant messaging systems, video game chat channels, text messages, bulletin board systems, web sites, discussion groups, newsgroups, and the like. In an embodiment, a collection agent (10) monitors natural language communications for keywords associated with a risk activity and records the IP Address of connections transmitting or receiving those messages. In an embodiment, a collection agent (10) transmits a message or keyword associated with a risk activity and records the IP Addresses of connections responding to those messages or keywords. The messages and/or communications may be public, semi-public, or private.

In an embodiment, a collection agent (10) is a "honeypot." A honeypot is a computer or virtual computer which is intended to be attacked. A honeypot may be intentionally deployed with security vulnerabilities to encourage malicious software attacks, or may be robust and resilient. In an embodiment, the honeypot (10) includes one or more collection agents (10) monitoring the honeypot (10). In another embodiment, a separate collection agent (10) monitors the honeypot (10). By way of example, a collection agent (10) may be an unpatched Windows system. When the system is attacked by a hacker, the IP Addresses of those attacks are recorded by the collection agent (10).

Figure 10:
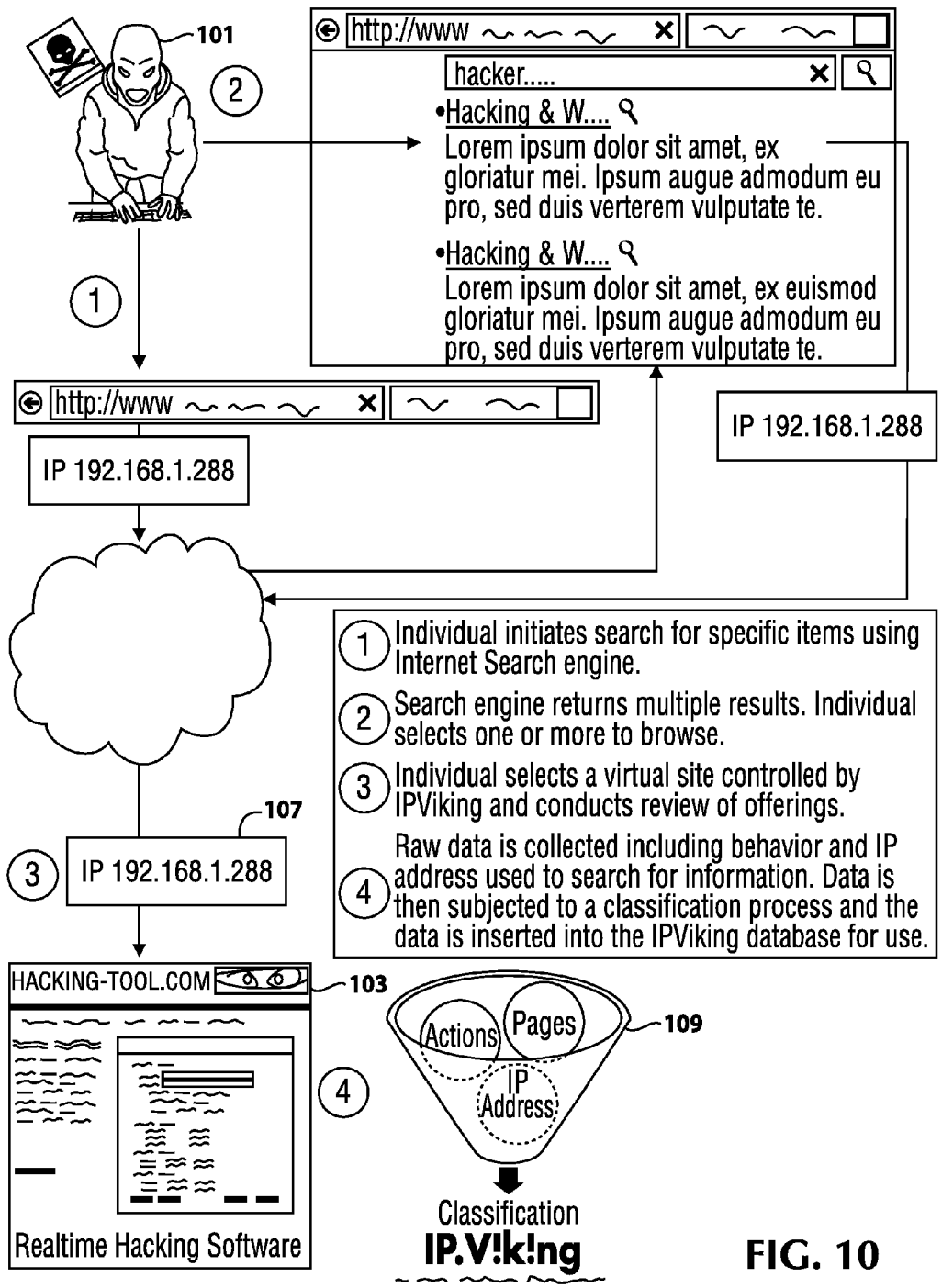
FIG. 10 provides a diagram showing how collection of IP data takes place in an embodiment.

In the embodiment depicted in FIG. 10, one or more of the collection agents (10) is a website (103). The web agent (103) is indexed by one or more third party search engines (105) such that the web agent (103) appears in search results produced by such third party search engines (105) in response to a user (101) using search terms indicative of a risk activity. By way of example and not limitation, a web agent (103) may have or appear to have content concerning recipes for constructing improvised explosive devices. When a user (101) searches a third party engine (105) for bomb recipes, the web agent (103) may appear in the search results. When the user (101) selects the web agent (103), the user's IP Address (107) is exposed to the web agent (103). The web agent (103) and/or another collection agent (10) records the IP Address (107), and one or more collection agents (10), which may be or include the web agent (103), gather risk information about that IP Address (107). The type of risk activity presented by the web agent (103) may be associated with the IP Address (107) by the collection agent (10) or by an analytical module (18, 20) to classify the type of risk activity presented by the IP Address (107). For example, because the user (101) was seeking instructions for building improvised explosives, that user (101) may present a threat for terrorism or school violence. A web site agent (10) may be indicative of one or more risk activities. In an embodiment, the third party search engine (105) is Google, Bing, or Yahoo. In an embodiment, the search engine (105) is a collection agent (10). By way of example and not limitation, the web agent (103) may contain HTML metadata, keywords, or links including or referencing search terms indicative of a risk activity.

In the depicted embodiment of FIG. 10, a web site agent (103) or another collection agent (10) may monitor a user's (101) activity on a web site agent (103). By way of example and not limitation, the web site agent (103) may offer or purport to offer links, files, services, or other information concerning one or more risk activities. In an embodiment, these risk activities may be the same as, or different from, the risk activity associated with the user's (101) search terms. For example, the web site agent (103) may appear to contain a list of recipes for homemade bombs designed for remote detonation. When the user (101) clicks on those links, a collection agent (10), which may be the web site agent (103), associates with the user's (101) IP Address (107) with one or more risk activities pertaining to homemade explosives, including but not limited to: terrorism, bullying, crime, violence, or weapons.

It is important to observe that the link on the web site (103) need not actually provide any data; it is enough to know that the user (101) wanted information that the link purported to provide. In this manner, information about the user's (101) interests and intentions may be gathered without providing the user with dangerous or illegal material. By way of example and not limitation, a web site agent (103) may appear to offer for download infringing digital copies of popular films, games, or songs. The web site agent (103) need not actually distribute or even have copies of such infringing materials; it is enough for a collection agent (10) to record the IP Addresses (107) of users (101) who attempted to download those infringing materials, as this information is indicative of the user (101) being engaged in risk activities associated with on-line piracy. This technique may also be used by collection agents (10) to identify one or more IP Addresses interested in other risk activities as well, without actually providing access to dangerous or illegal materials, services, or activities.

In an embodiment, a collection agent (10) is an FTP agent. FTP is a standard protocol for transferring files between computers on a network and is layered on top of TCP/IP. FTP is generally considered a security risk because ordinary FTP transmissions and connections are not secure or encrypted, and FTP sites have traditionally provided open access to the public, allowing any user to store or retrieve files on the FTP server without providing any identifying information or verifiable credentials, such as name, address, telephone number, e-mail address, user name, or a password. Although FTP servers often request an e-mail address, there is no verification mechanism and public FTP servers often allow "anonymous" or fake e-mail addresses. The content of FTP servers is also generally not indexed by major search engines, placing it "off the radar" of simple and inexpensive search and detection techniques which could quickly and easily reveal networked computers full of illegal or suspicious material. Although FTP is still primarily used for legitimate purposes, these characteristics are indicative of a risk activity.

In an embodiment, a collection agent (10) is an FTP server. In another embodiment, a collection agent (10) is an FTP client. In a still further embodiment, a collection (10) monitors network traffic associated with FTP servers, sites, and/or clients. In an embodiment, an FTP site, which may be an FTP agent (10), includes or appears to include content indicative of a risk activity. A collection agent (10), which may be an FTP agent (10), may record the IP Address of a user (101) connected to the FTP site or engaged in FTP transactions with the site. In an embodiment, an FTP agent (10) monitors a user (101) by monitoring which files or materials the user (101) attempts to access, and which risk activities are associated with that content. In an embodiment, a user (101) downloads or attempts to download files or other content from an FTP server monitored by a collection agent (10), which may be the FTP server itself. By way of example and not limitation, an FTP server agent (10) may contain or appear to contain digital media files infringing on copyrights. When a user (101) attempts to access or download those files, a collection agent (10) records the user's (101) IP Address (107) and associates that IP Address (107) with risk activities pertaining to digital piracy and intellectual property infringement.

In an embodiment, a user (101) uploads materials or content to an FTP server agent (10) and a collection agent (10), which may be the FTP server agent (10), submits data pertaining to the uploaded content for analysis and classification of any risk activities associated with the uploaded content. In another embodiment, the collection agent (10) itself performs some or all of this analysis and classification. By way of example and not limitation, if a user (101) uploads an image file having a signature matching known child pornography images, the collection agent (10) records the IP Address (107) for that user (101) and associates the IP Address with risk activities pertaining to the distribution of child pornography.

In an embodiment, a collection agent (10) is an IRC agent. IRC is an open protocol for real time chat or text messaging, and is mainly designed for group communication organized into topical discussion forums, sometimes called channels. Many IRC servers also allow one-to-one private messages, as well as data and file transfer. IRC is built on top of TCP/IP and was originally engineered with little security or identity verification. IRC channels generally are not indexed by major search engines, placing IRC "off the radar" of simple and inexpensive search and detection techniques which could quickly and easily reveal networked computers full of illegal or suspicious material. Though a substantial amount of legitimate and innocent traffic takes place over IRC servers, IRC remains an attractive medium for individuals with nefarious intent, and use of IRC may be indicative of a risk activity.

In an embodiment, a collection agent (10) is an IRC server. In another embodiment, a collection agent (10) is an IRC client. In a still further embodiment, a collection agent (10) monitors network traffic associated with IRC servers, sites, and/or clients. In a still further embodiment, a collection agent (10) monitors messages, interactions, and communications on an IRC server, including without limitation: chat on public or private channels; private messaging; file exchange; connection and disconnection times; user handles; source and destination IP Addresses. In an embodiment, an IRC site, which may be an IRC agent (10), includes or appears to include content indicative of a risk activity. A collection agent (10), which may be an IRC agent (10), may record the IP Address of a user (101) connected to an IRC site or engaged in IRC transactions, including file transfers and natural language communications. In an embodiment, an IRC agent (10) monitors a user's (101) activity such as, without limitation, by monitoring which files or chat channels the user (101) attempts to access, and which risk activities are associated with those files or chat channels. In an embodiment, a user (101) downloads, exchanges, or attempts to download or exchange files or other content through an IRC server monitored by a collection agent (10), which may be the IRC server itself. By way of example and not limitation, an IRC server agent (10) may contain or appear to contain chat channels for discussion of cracking digital rights management technologies. When a user (101) joins those chat channels, and/or transmits or receives messages or natural language communications about that topic, a collection agent (10) records the user's (101) IP Address (107) and associates that IP Address (107) with risk activities pertaining to digital piracy and intellectual property infringement.

In an embodiment, a user (101) uploads or transmits natural language communications to an IRC server and a collection agent (10) submits to analytical modules (18, 20) data pertaining to the uploaded content for analysis and classification of any risk activities associated with the uploaded content. In another embodiment, the collection agent (10) itself performs some or all of this analysis and classification. By way of example and not limitation, if an IRC user (101) transmits a communication which matches keywords known to be used by those engaged in the transmission or production of child pornography images, a collection agent (10) records the IP Address (107) for that user (101) and associates the IP Address (107) with risk activities pertaining to the distribution of child pornography.

In an embodiment, a collection agent (10) is a newsgroup agent. A Usenet newsgroup is generally a repository of binary or plain text information posted by users, ostensibly for the purpose of discussion. Particular client software is generally required for connecting to a newsgroup and examining its content, and newsgroup participation is largely confined to individuals who are familiar and comfortable with older Internet technologies. Newsgroups allow the distribution of binary files, but because Usenet was engineered with the transmission of text in mind, binary data is usually encoded using a technique called uuencode, and a single file may be split up over multiple postings, requiring the user to manually reassemble the uuencoded data and then uudecode the data using a specialized program. In the modern day, news clients are able to automatically perform this decoding and encoding. Newsgroups disproportionately attract individuals with nefarious intent, and may be indicative of a risk activity.

In an embodiment, a collection agent (10) is a newsgroup server or service provider. In another embodiment, a collection agent (10) is a newsgroup client or participant. In a still further embodiment, a collection agent (10) monitors network traffic associated with newsgroup servers, service providers, sites, and/or clients. In an embodiment, a newsgroup hierarchy monitored by a collection agent (10) includes or appears to include content indicative of a risk activity. A collection agent (10) may record the IP Address of a user (101) connecting to a newsgroup or engaged in newsgroup transactions, including file transfers and natural language communications. A collection agent (10) monitors a user's (101) activity such as, without limitation, by monitoring which files or materials the user (101) attempts to access, and which risk activities are associated with that content. In an embodiment, a user (101) downloads, exchanges, or attempts to download or exchange files or other content through a newsgroup monitored by a collection agent (10), which may be the newsgroup service provider itself. By way of example and not limitation, a newsgroup may contain or appear to contain files infringing on intellectual property rights or discussion about cracking digital rights management technologies. When a user (101) transmits or receives messages or files about that topic, a collection agent (10) records the user's (101) IP Address (107) and associates that IP Address (107) with risk activities pertaining to digital piracy and intellectual property infringement.

In an embodiment, a user (101) uploads or transmits materials or content to a newsgroup and a collection agent (10) submits data pertaining to the uploaded content for analysis and classification of any risk activities associated with the uploaded content. In another embodiment, the collection agent (10) itself performs some or all of this analysis and classification. By way of example and not limitation, if a newsgroup user (101) transmits a natural language communication which matches keywords known to be used by those engaged in the transmission or production of child pornography images, a collection agent (10) records the IP Address (107) for that user (101) and associates the IP Address (107) with risk activities pertaining to the distribution of child pornography.

In an embodiment, a collection agent (10) participates in a P2P network. P2P networks were developed in the late 1990s and early 2000s as a response to lawsuits shutting down file sharing programs primarily used to carry out copyright infringement, notably Napster. A number of other file sharing services have come and gone over the years, including Gnutella, eDonkey, Morpheus, and Limewire. These file sharing repositories were vulnerable to legal attack because a successful lawsuit shutting down the central repository generally spelled the end of file sharing through that system. However, with true P2P networks, file sharing does not depend upon a central repository; rather the individual clients participating in the P2P network speak directly to each other and exchange data directly with each other. In a P2P network, any given participant downloading a file may download different pieces of that single file from dozens or hundreds or even thousands of different users, rendering it difficult to put a stop to the file sharing. Further, it is also difficult to detect participation in a P2P network because any given data packet transmitted through that system will contain at most a tiny fraction of a much larger file, such as an audio file or a movie. P2P networks require little to no user verification, authentication, or other security, one need only download and install the appropriate client software, and begin to use it anonymously. As a consequence, certain types of illegal activity are rampant on P2P networks, notably digital piracy. Additionally, the anonymous and distributed nature of P2P networks is conducive towards the distribution of criminal material, such as child pornography. P2P networking systems include, but are not limited to: bittorrent, and Ares Galaxy, the de facto successor to Gnutella.

In an embodiment, a collection agent (10) participates in a P2P network, including without limitation as a: web site, server, client, user, system, network, reference, relay, seeder, leecher, host, or anonymizer. In a still further embodiment, a collection agent (10) monitors network traffic associated with P2P servers, service providers, sites, and/or clients. In an embodiment, a P2P network or site monitored by a collection agent (10) includes or appears to include content indicative of a risk activity. A collection agent (10) may record the IP Address of a user (101) connecting to a P2P service or engaged in P2P transactions, including file transfers and natural language communications. A collection agent (10) monitors a user's (101) activity such as, without limitation, by monitoring which files or materials the user (101) attempts to access, and which risk activities are associated with that content. In an embodiment, a user (101) downloads, exchanges, or attempts to download or exchange files or other content through a P2P network monitored by a collection agent (10). By way of example and not limitation, a P2P network may contain or appear to contain files infringing on intellectual property rights. When a user (101) transmits, receives, or attempts to transmit or receive such infringing files, a collection agent (10) records the user's (101) IP Address (107) and associates that IP Address (107) with risk activities pertaining to digital piracy and intellectual property infringement.

In an embodiment, a user (101) uploads or transmits materials or content to a P2P network and a collection agent (10) submits data pertaining to the uploaded content for analysis and classification of any risk activities associated with the uploaded content. In another embodiment, the collection agent (10) itself performs some or all of this analysis and classification. By way of example and not limitation, if a P2P user (101) transmits a file whose signature is known to be associated with a child pornography image, a collection agent (10) records the IP Address (107) for that user (101) and associates the IP Address (107) with risk activities pertaining to the distribution of child pornography.

Figure 8:
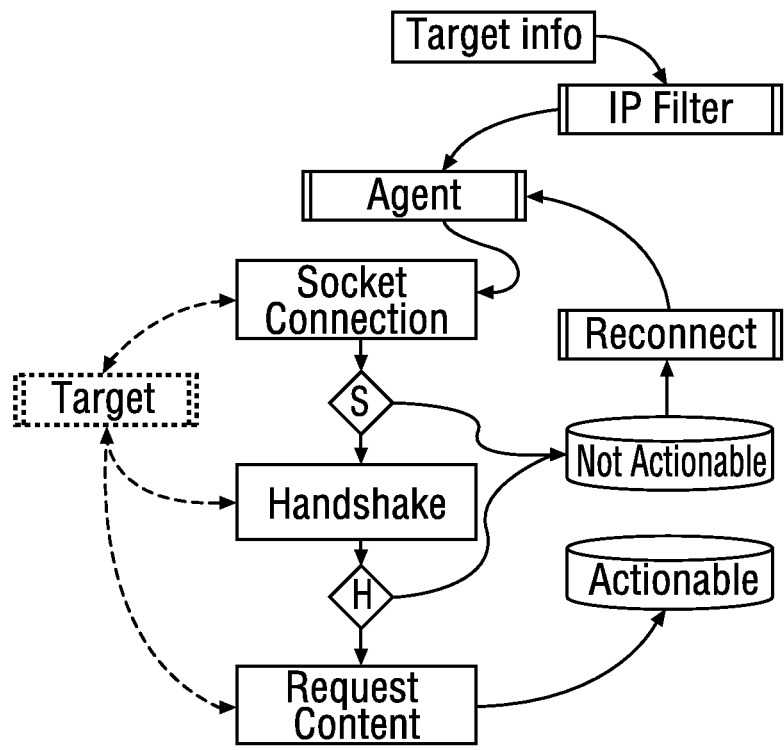
FIG. 8 provides a diagram of agent logic from an embodiment of a virtual agent.

In the embodiment depicted in FIG. 8, a collection agent (10) attempts direct connection monitoring with an IP Address identified as a potential security risk. Network connections over TCP/IP generally require two pieces of information to "talk to" a remote machine: the IP Address, and a port number. The port number indicates which service provided by the remote computer the connecting machine wishes to interact with. Certain port numbers are conventionally associated with specific services, such as running web servers on port 80. In an embodiment, a collection agent (10) attempts to open a socket connection with an IP Address on a port. If that connection fails, the fact that the IP Address does not accept connections on that port may be indicative of a risk activity, or may lessen the probability of a risk activity. In another embodiment, a failed connection is disregarded. Whether a failed connection on a given port is indicative depends not only on the embodiment, but on the nature of the target and the service associated with the port. By way of example and not limitation, the fact that an individual's desktop computer is not accepting connections on port 80 generally is not suspicious because desktop computers do not normally provide web hosting services.

If a collection agent (10) successfully connects to a target IP Address at a port, the collection agent (10) may attempt to communicate with the remote host using a protocol. This protocol may be the protocol conventionally associated with the port, or another protocol. If the remote host does not properly respond, the collection agent (10) may record this as indicative of a risk activity, or, depending on the nature of the failure, simply disregard the incidence, such as a misconfigured system. By way of example, and not limitation, a server running on port 80 which does not appear to recognize or communicate using HTTP may be indicative of a risk activity. In another embodiment, the ability of a remote host to communicate using a protocol which is not generally associated with a given port may be indicative of a risk activity. For example, a web server running on a port in the ephemeral port range may be indicative of a risk activity, as it suggests a web server avoiding attention.

In an embodiment, combinations of these and other collection agents (10) may work cooperatively and independently to gather intelligence information. By way of example and not limitation, one collection agent (10) on a newsgroup may post a bogus file purporting to contain a "theater cam" copy of a recently released film, and another collection agent (10) records the IP Addresses of users who respond to that post or attempt to download it. Another collection agent (10) then attempts direct connections with one or more of those IP Addresses using well-known ports for services such as FTP and HTTP. Where connections are made, the collection agents (10) navigate the remote systems in search of files matching the signatures of widely-distributed infringing files, and other collection agents (10) monitor P2P networks for traffic to and from those IP Addresses. Other collection agents (10) posing as web sites hosting infringing content or offering access to P2P networks hosting infringing content may also record hits from these IP addresses. As these agents (10) yield and store evidence of infringing materials associated with certain IP Addresses, those IP Addresses may be highly rated for copyright infringement risk by the rating engine (18) and/or data mining engine (20).

Although certain examples of particular implementations of collection agents (10) using certain technologies and/or protocols have been described in detail herein, it is specifically contemplated that collection agents (10) may take the form of other types of servers, clients, service providers, systems, networks, protocols, tools, utilities, software, and/or hardware. The specific explanation of some types of collection agents (10) should not be understood to exclude other types of collection agents (10).

In an embodiment, a collection agent (10) need not actually provide or facilitate the transfer of any data or files. Generally speaking, it is enough to know that a user (101) wanted data, files, or materials that the collection agent (10) appears to facilitate or provide. In this manner, information about the user's (101) interests and intentions may be gathered without providing the user (101) with dangerous or illegal materials. In an embodiment, a collection agent (10) inhibits further distribution of dangerous or illegal content, such as by deleting or polluting files, applying watermarks to files, or transmitting garbage or noise.

It is important to note that these technologies have legitimate uses. They may be indicative of a risk activity because they tend to attract use by individuals interested in engaging in malicious or criminal activity. These technologies generally share several features in common, notably lack of user identification or verification, open protocols, exclusion from search engine indexing, and use of specialized clients.

In the embodiment depicted in FIG. 1, a collection agent (10) is autonomous. Autonomous collection agents (10) generally operate without direct human input or control. An autonomous collection agent (10) gathers information and performs its other functions, which are discussed elsewhere in this disclosure, using artificial intelligence and algorithms. Autonomous collection agents (10) will, for example, automatically provide gathered information to analytical modules (18, 20), as depicted in FIG. 1.

In an embodiment, a collection agent (10) is semi-autonomous. Semi-autonomous collection agents (10) operate generally independently, but their behavior may be altered, tweaked, reconfigured, or otherwise modified as necessary without having to redeploy or rebuild the collection agent (10) in response to changing conditions or operational needs. For example, the collection agent (10) may be software which is configured to receive and recognize certain signals from a master control program, such as a spider or friendly bot herder, which directs a collection agent (10) to, by way of example and not limitation: activate, de-activate, hibernate, change targets, focus on a specific target, ignore a specific target, terminate, self-destruct, or transmit or submit gathered data for analysis.

In an embodiment, autonomous and semi-autonomous collection agents (10) may be augmented and supplemented by human agents (10) who monitor communications and data. In a still further embodiment, such human agents (10) launch and maintain additional autonomous or semi-autonomous collection agents (10), or to provide information directly to the rating system (18), based on security intelligence data gathered by the human agents (10).

In an embodiment, a collection agent (10) is implemented through a virtual computer. In another embodiment, a virtual collection agent (10) is created, constructed, and/or maintained using host systems located within secured facilities. In a still further another embodiment, a virtual collection agent (10) is created, constructed, and/or maintained through the use of "friendly bot herders," spiders, or similar programs designed to control and coordinate multiple collection agents (10). In a still further embodiment, a collection agent (10) may utilize an existing bot network, including without limitation a bot network intended for illegitimate or malicious purposes.

In an embodiment, a collection agent (10) identifies and/or classifies invalid Internet traffic. By way of example and not limitation, a collection agent (10) may identify bogon IP Addresses. A "bogon" IP Address is an IP Address that should not exist. Bogon IP Addresses may be created inadvertently or intentionally, and are generally indicative of a risk activity. In another embodiment, a collection agent (10) may identify "Martian packets." Martian packets are Internet Protocol packets whose source or destination addresses are not possible under the conventions, standards, specifications, rules and/or operational guidelines of the Internet. By way of example and not limitation, a collection agent (10) identifies packets on the public Internet purporting to originate from a private netblock, such as 192.168.0.0/16, or packets originating from localhost IP Addresses, such as 127.0.0.1, but appearing on a non-loopback interface. In an embodiment, a collection agent (10) identifies a legitimate and/or valid source and/or destination IP Address for a bogon IP Address and/or Martian packet. In an embodiment, a collection agent (10) identifies a legitimate and/or valid source and/or destination netblock for a bogon IP Address and/or Martian packet.

In the embodiment depicted in FIG. 1, the system gathers security intelligence data through third party sources (12). It is impossible to enumerate and describe all possible third party sources of data (12) which may be utilized, as new threats emerge daily, and new sources of usable third party data (12) come and go. Generally speaking, third party data (12) includes data provided by the Internet Assigned Numbers Authority ("IANA") and Internet access and service providers ("ISPs"), including but not limited to: dial-up providers, DSL providers, cable Internet providers, wireless networking services, microwave providers, radio wave providers, satellite providers, ISDN providers, T1 and T3 providers, fiber optic providers, direct Ethernet providers, frame relay providers, ATM providers, tier two providers, and tier three providers. In an embodiment, the type of data (12) produced by these and other sources pertains to valid IP Addresses in the addressing space for a given network or sub-network. These data sources may be used, for example, to identify Martian packets and bogons. Any method may be used to collect this third party data (12), including without limitation by subscription, by request, or through the use of automated or semi-automated processes such as collection agents (10). In an embodiment, third party data (12) is stored in a database (14).

Figures 6, 7:
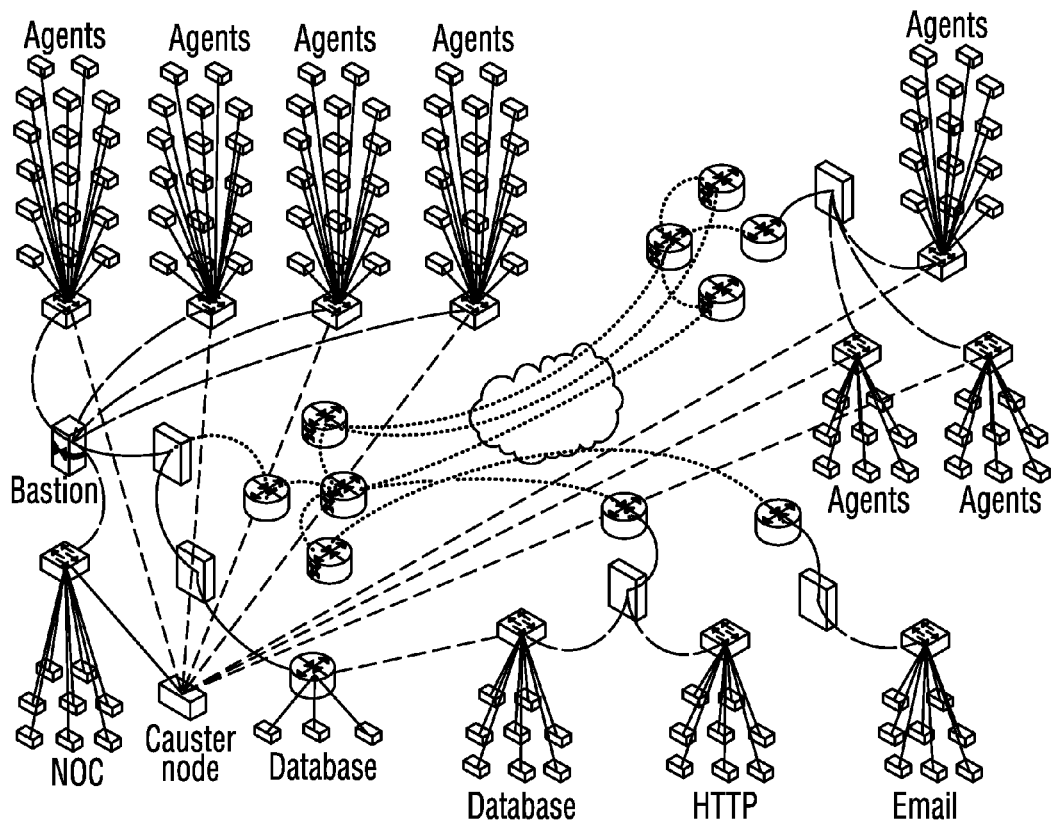
FIG. 6 provides a conceptual diagram of the operation of collection agents in an embodiment.
FIG. 7 provides a conceptual diagram of agent anonymity in an embodiment.

In an embodiment, a central control program tracks IP Addresses belonging to collection agents (10) and causes collection agents (10) to disregard each other as potential security threats. The collection agents (10) generally are anonymous and indistinguishable from ordinary Internet users. By purposefully obscuring the nature of the collection agent (10), persons engaged in risk activities are not discouraged from interacting with them, believing them to be "safe" connections or other wrongdoers complicit in malicious attacks and criminal conduct. FIG. 7 provides some of the techniques utilized to obscure and mask the nature of collection agents (10).

In an embodiment, the collection agents (10) provide the security risk data to one or more analytical modules (18, 20). These modules (18, 20) are discussed in detail elsewhere in this disclosure, but generally include, without limitation: methods, systems, and software to perform statistical analysis, categorization, rating, and data mining. In an embodiment, the collection agents (10) provide the data by storing it in a database (14) accessible to the analytical modules (18, 20), but the specific format and mechanism for providing the gathered intelligence to these modules will necessarily vary from embodiment to embodiment.

In an embodiment, a database system (e.g., 14, 22, 28, 30) may be of any degree of complexity, including but not limited to a commercial enterprise-grade relational database management solution, a flat file, a series or set of flat files, or memory-mapped binary file, or a series or set of memory-mapped binary files. In an embodiment, the database is a commercial or proprietary database, such as but not limited to: Oracle, MS Access, SQL Server, DB2, Adabas, FoxPro, or Sybase. In another embodiment, the database is an open source or free software database, or a derivation thereof, such as but not limited to: MySQL, PostgreSQL, or SQLite. In an embodiment, more than one database system is utilized. The particular database will vary depending upon the amount of storage needed, the processing power required, and the operating system or operating systems in the environment. In an embodiment, the database is written from scratch or adapter from an existing database system.

In an embodiment, the collection agents (10) continuously transmit newly gathered information for analysis and processing. This may be done by storing in a database (14) or through some other means. In another embodiment, the collection agents (10) cache or store gathered intelligence and transmit security risk intelligence for analysis and processing on a periodic basis, in response to signals, events, or instructions. In a further embodiment, both techniques are utilized.

In an embodiment, the collection agents (10) provide the data to the analytical modules (18, 20) through a means other than by storing the data in a database (14), including, but not limited to: shared memory; a network socket connection; a domain socket; interprocess communications mechanisms; a message queue; or through some other message passing protocol or mechanism. In an embodiment, the collection agents (10) provide the data collected directly to the analytical modules (18, 20). A combination of techniques may also be utilized, such as by a collection agent (10) storing to a raw database (14) by connecting over a network socket to a database server or another device connected to the database server.

In the depicted embodiment of FIG. 1, data collected by collection agents (10) is primarily stored in a "raw" database (14) prior to being processed or analyzed. This "raw" database effectively contains a snapshot of all security intelligence data gathered by the collection agents (10) at any point in time, reflecting a holistic real-time view of all security threats known to the system as of that moment in time. In an embodiment, this "raw" database (14) is replicated (16) for backup, archival, and business continuity purposes. In another embodiment, the "raw" database (14) is replicated (16) into a "staging" database (22). The replication may be done through any known means of duplicating a database, and the specific means will necessarily depend on the operating system, database system, overall system architecture, and other tools for migrating data.

The systems and methods discussed herein, among other things, analyze the gathered intelligence to assess the risk profile presented by a given IP Address at a given point in time. In an embodiment, the raw data associated with each IP Address is stored in a database (14) and examined by various rating processes (18, 20) to arrive at an assessment of the risk presented by that IP Address with respect to specific types of transactions. This assessment is sometimes referred to herein as a "score" or "risk score." In an embodiment, this score is a numerical value ranging from 0 to 100, with a risk score of 0 representing the least risk for a particular risk category and a risk score of 100 representing the most risk for a particular risk category.

In an embodiment, the rating process (18) uses an algorithm, or set of algorithms, to determine the categories of risk activity for an IP Address, the likelihood of a category of risk activity for an IP Address, and/or the severity of threat presented for a category of risk activity for an IP Address. In an embodiment, one or more algorithms is an AI or machine learning algorithm. A plurality of algorithms may operate independently or in concert. In a further embodiment, a plurality of algorithms interoperates as a system and develops machine learning over time. In a still further embodiment, a plurality of algorithms learns and teaches itself. In a still further embodiment, a plurality of algorithms learns and teaches itself by examining its own past performance. By way of example and not limitation, a plurality of algorithms may teach itself by using its own data output (32) as one or more predicates, postulates, assumptions, or other knowledge or input into the rating engine (18).

Figure 3:
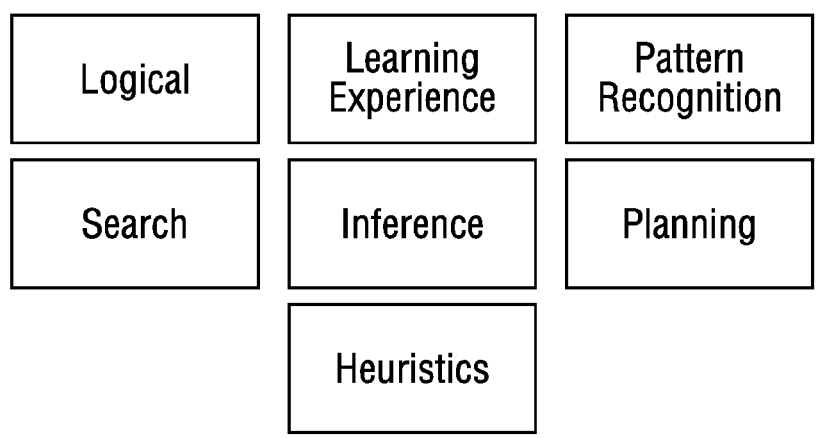
FIG. 3 provides a conceptual diagram of various types of artificial intelligence that may be used in an embodiment.
Figure 4:
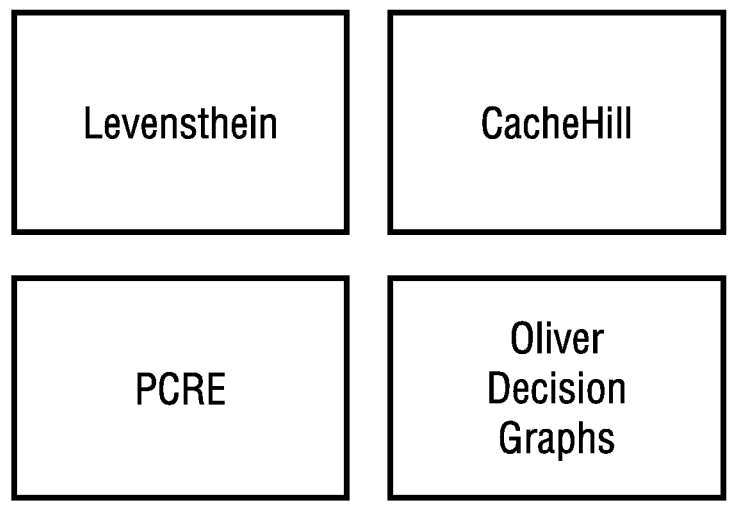
FIG. 4 provides a conceptual diagram of rating algorithms that may be used in an embodiment.

FIGS. 3 and 4 provide a conceptual overview of some of the types of AI techniques and methodologies used within the rating engine (18). In an embodiment, the rating process (18) performs risk evaluation of the raw data (14) based on various factors and methodologies including without limitation: logic; learning; experience; pattern recognition; searching; inferential; planning; heuristic; Levensthein; CacheHill; PCRE; Oliver decision graphs; or any combination thereof. In addition to the depicted algorithms, an embodiment may utilize, without limitation: machine learning; inductive logic; decision trees; association rules; neural networking; genetic programming; clustering; Bayesian networking; representation learning; support vector learning; reinforcement learning; supervised learning; unsupervised learning; transduction learning; self-modifying learning; self-teaching learning; or any combination thereof. In an embodiment, algorithms may be utilized that are not presently known but which would be suitable to the analytical framework of the rating system (18). In an embodiment, one or more algorithms provide a look-back to prior decisions made by the system, and/or a look-forward to apply lessons learned in those prior decisions to future decisions made by the system.

Figure 2:
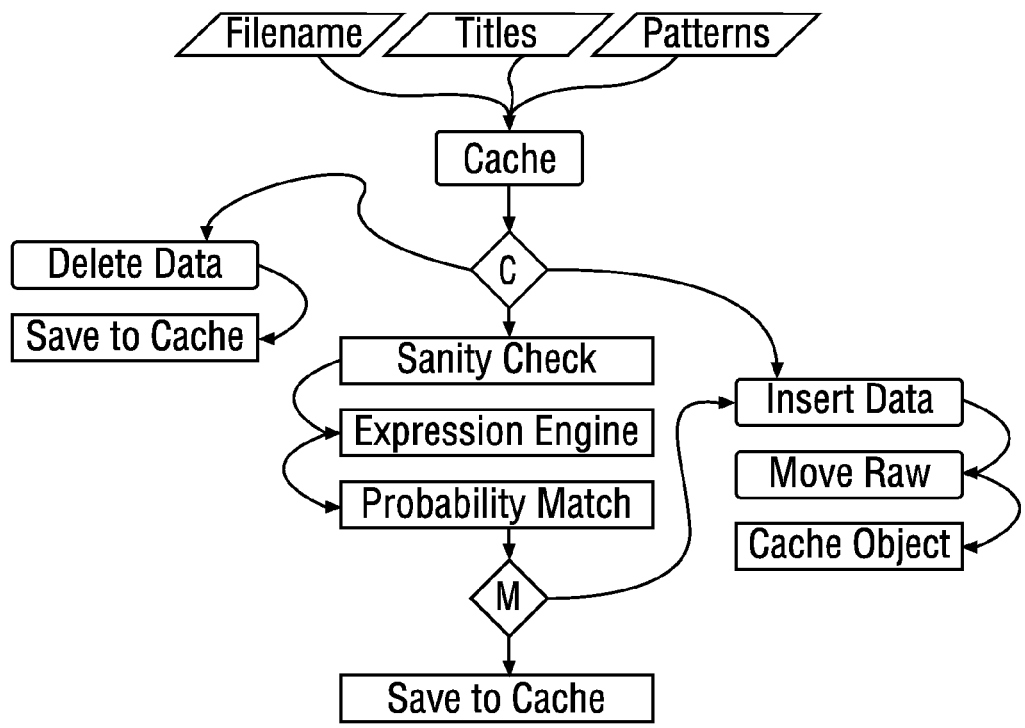
FIG. 2 provides a diagram of inductive rating logic flow in an embodiment.

FIG. 2 depicts an embodiment of a rating system (18) algorithm data flow using an inductive logic algorithm to compute risk ratings for the collected data. In an embodiment, the rating system (18) utilizes core modules to categorize, classify, and rank the risk presented by an IP Address based on the data associated with that IP Addresses collected by one or more collection agents (10). In an embodiment, the rating engine (18) is capable of neurological growth. In an embodiment, the results, conclusions, products, and/or outputs of the rating engine (18) are utilized as predicates or background knowledge for the rating engine (18).

In an embodiment, the rating engine (18) receives risk intelligence regarding an IP Address and/or a particular communication from collection agents (10) and the rating engine (18) rates and categorizes the risk for that IP Address. This rating and categorization may include keywords, knowledge, predicates, or other information which may modify or improve the intelligence-gathering functions the collection agents (10) perform. By way of example and not limitation, the collection (10) may identify a malicious Internet site whose users have adopted new jargon or terminology in chat rooms to disguise their intentions. These keywords are gathered by the collection agents (10) and submitted to the rating engine (18) for analysis and evaluation, and those keywords may then be distributed to other collection agents (10) as a new keywords for the collection agents (10) to utilize in gathering security intelligence from other sites and IP Addresses, allowing the system to learn and distribute newly acquired knowledge. In an embodiment, databases (14, 22) are utilized to store, share, and/or distribute knowledge acquired by the system between and among collection agents (10), the rating engine (18), and other analytical modules (20). In an embodiment, a data mining module (20) performs or augments these analytical tasks.

In an embodiment, the rating system (18) is software. Rating system (18) software may be implemented in any language or combination of languages, whether compiled, interpreted, scripted, or executed through a virtual machine or other run-time environment, and may be compiled or otherwise made executable on any operating system or combination of operating systems. In an embodiment, the rating system (18) is written in C, C++, Java, LISP, or Prolog. In an embodiment, the rating system (18) utilizes one or more multiprocess architectures, multithreaded architectures, multiplatform architectures, interprocess communication techniques, interthread communication techniques, distributed and/or cloud computing architectures, and/or a combination thereof. In an embodiment, the rating system (18) is used on a Unix or Linux operating system. In an embodiment, the rating system (18) is used on an operating system compliant with one or more POSIX standards.

In an embodiment, the rating system (18) is configured, controlled and/or guided by one or more sets of filters and/or rules. These rules may be provided to the rating system (18) through any technique, including without limitation by: hard-coding, configuration file, command line parameters or arguments, environment variables, selection from a database, transmission over a network or domain socket, signal interrupt, instruction from other software, direct human input, or a combination thereof.

In an embodiment, the rating system (18) operates in real time. In an embodiment, the rating engine weighs and compares different factors to arrive at a numerical assessment of the severity of risk presented by a given IP Address, as well as the risk categories for that risk activity. Because the present systems and methods are designed to be "learning" systems, a complete examination of the weighing and balancing of these factors is impossible, but some illustrative, but not limiting, examples are provided herein, such as in FIG. 2.

In an embodiment, the rating system (18) includes one or more modules which may be separated from other modules. Modules may be separated using any criteria, including without limitation by: rating methodology; type of threat; type of intelligence gathered. In an embodiment, a customer using an embodiment of the present invention may use zero, one, or more than one of the rating system (18) modules included in the embodiment. In another embodiment, a customer may include rating services, modules, or products offered by a third party and not included in the embodiment. In an embodiment, a rating system and/or module (18) can operate in a "stand-alone" mode. In another embodiment, one or more rating system (18) modules are under the custody and/or control of the customer or a third party.

In the depicted embodiment of FIG. 1, the systems and methods include one or more data mining (20) processes. In an embodiment including a data mining (20) process, data mining (20) is used to improve the accuracy of the rating system (18). For example, data mining (20) processes may perform statistical analysis on data (14) to identify trends, relationships, and other statistically useful data about the data (14). Data mining (20) may be part of the rating process (18), or a separate and distinct process.

In an embodiment, data mining (20) provides security risk data to a rating engine (18). Such intelligence may be used to more accurately and consistently identify and classify security risk. By way of example and not limitation, a collection agent (10) may identify a single IP Address as a likely security threat and the rating process (18) may classify that threat as a botnet zombie. Data mining (20) may then further identify: other zombies in thrall to the same bot herder; the IP Address of the bot herder; other IP Addresses utilized by the hot herder; and/or, the attack being attempted. In an embodiment, data mining (20) output is stored in a database (14, 22). In another embodiment, the data mining (20) output is stored through some mechanism other than a database.

The specific architecture and relationship between where and how raw data (14) is stored, staging data (22) is stored, and the results of data rating (18) and data mining (20) are stored, will necessarily depend upon the specific operating systems, hardware systems, network architecture, and other enterprise-specific business decisions. By way of example and not limitation, these various systems and elements may be implemented or executed on the same or different physical hardware, in the same or different facilities, using the same or different database system, using the same or different database schema, using the same or different database, using the same or different number of network subnets, or any combination thereof.

There are myriad categories of threats presented on-line, but for any given user of the present invention, not all categories of threats are necessarily relevant to the user's business. By way of example and not limitation, an IP Address that poses a significant threat for on-line music piracy may pose little or no threat for fraud or identity theft, and an on-retailer may be happy to conduct a commercial transaction with that IP Address, whereas a content hosting service may not. In an embodiment, the end-user of the present invention, sometimes referred to as the "client," provides client input (24) specifying the classes and categories of transactions and/or risk on which the client wishes to receive risk assessment data. For example, the client may select risk categories which present the most significant negative impact on the client's operations. In such an embodiment, the client is able to protect itself from certain types of risk activity while accepting others. By way of example and not limitation, the client may protect itself from fraudulent or commercially dubious retail transactions without inadvertently blocking legitimate transactions with IP Addresses that pose little commercial threat, but may pose other types of risk.

Client input (24) refers to customers or clients using the systems and methods described herein, or of businesses offering the systems and methods of the present invention as a product or service. This usage should not be confused with the term "client" as applied to a network client or application client, such as a program attempting to open network sockets to remote hosts, or with input provided to such network clients or by such clients. One of ordinary skill in the art can determine from context which of these two separate uses of the term "client" to apply.

In the depicted embodiment of FIG. 1, the raw data (14) is processed by the data rating (18) and/or data mining (20) processes and stored in a staging database (22). In the depicted embodiment, the staging (22) data has been "rated" and includes a list of IP Addresses classified and rated as presenting a threat in the categories of risk activity selected by the client (24). In an embodiment, this data is provided directly to the client from this database (22). This data may be synchronized (26) to a production database server (28) and/or a warehouse database (30).

In the depicted embodiment, a warehouse database (30) includes, among other things, raw data. This raw data may include, for example, raw intelligence gathered by collection agents (10), output from rating (18) or data mining (20), client input (24), dumps of tables from one or more databases (14, 22, 28, 30), or any combination thereof. This data may be provided to the customer (36) through any of the means that rated data output (32) is provided. The particular architecture and delivery mechanism for output (32) will necessarily vary depending upon the business needs and resources of a particular client.

In an embodiment, a production database server (28) provides rated data to a customer. As depicted in FIG. 1, the production database (28) is synchronized (26) with the staging database (22) and thus contains IP Addresses determined to be malicious according to the criteria selected by the client (24). In an embodiment, the business client may contact the production database (28) directly, or through another device or computer. For example, in an embodiment, the production database (28) may not be accessible to the public Internet, but only through a web server. Clients would then connect to the web server and request data, and the web server would then retrieve the appropriate data from the production database (28) and provide it to the client.

In an embodiment, the flow of information is continuous from the collection agents (10) to the production database (28), meaning that the output from the production database (32) reflects real time data about each IP Address. In such an embodiment, as IP Addresses appear and disappear from the Internet, or the security risks presented by those IP Addresses alter in severity or classification, the risk score for that IP Address for each category selected by the client (24) flows through the depicted embodiment to the production database (28) and is reflected in the output (32) in real time.

System output (32) may be delivered through any means, including without limitation: an appliance; software-as-a-service; a web site; an application; a mobile device; a mobile device application; digital or written reports; a database query; a network transmission; a file exchange; a remote procedure call; a software interface; an application programming interface; or, a software utility. An application programming interface ("API") for obtaining output (32) may be implemented in any computer language, for use with any computer language, including but not limited to: machine languages, assembly languages, C, ANSI C, C++, Perl, PHP, Ruby, Java, JavaScript, Common Gateway Interface, HTTP, Flash, Actionscript, Virtual Basic, Python, AJAX, JSP, ASP, C#, .NET, Objective C, or any high level language or protocol through which an API request may be transmitted and answered over a network.

In an embodiment, the production database (28) is a local computer to the client. In another embodiment, the production database (28) is a remote computer to the client. In a still further embodiment, the production database (28) is a remote computer to the client and the client has a local server which communicates with the remote production database (28).

A customer typically uses the present invention by checking whether an IP Address seeking to conduct a transaction with the customer is listed as presenting a significant threat for the type of activity proposed. This check is generally done by submitting the IP Address to the production database (28) and checking the output (32), which includes the nature and severity of threats presented by that IP Address. In an embodiment, the interface produces (32) to the client a list of all threats presented. In another embodiment, the interface produces (32) to the client only those threats selected by the client in the client input (24). In a still further embodiment, the client specifies in the client's inquiry the categories of risk for which the client is requesting a risk score, and the interface produces (32) the risk scores only for those categories.

In an embodiment, a customer may conditionally allow a proposed transaction from a suspicious IP Address, giving the appearance to the IP Address user that the transaction has been accepted, but the customer may then validate the purchase before finalizing the order and releasing products or services. Also by way of example and not limitation, in a transaction involving a credit or debit card, the credit card company or bank may place a hold on the transaction and contact the cardholder of record to validate the transaction before releasing the funds. In an embodiment where the client is not able to validate the transaction, this fact itself may also be collected (10) and used by the system to assess the risk associated with the IP Address at issue.

Figure 12A:
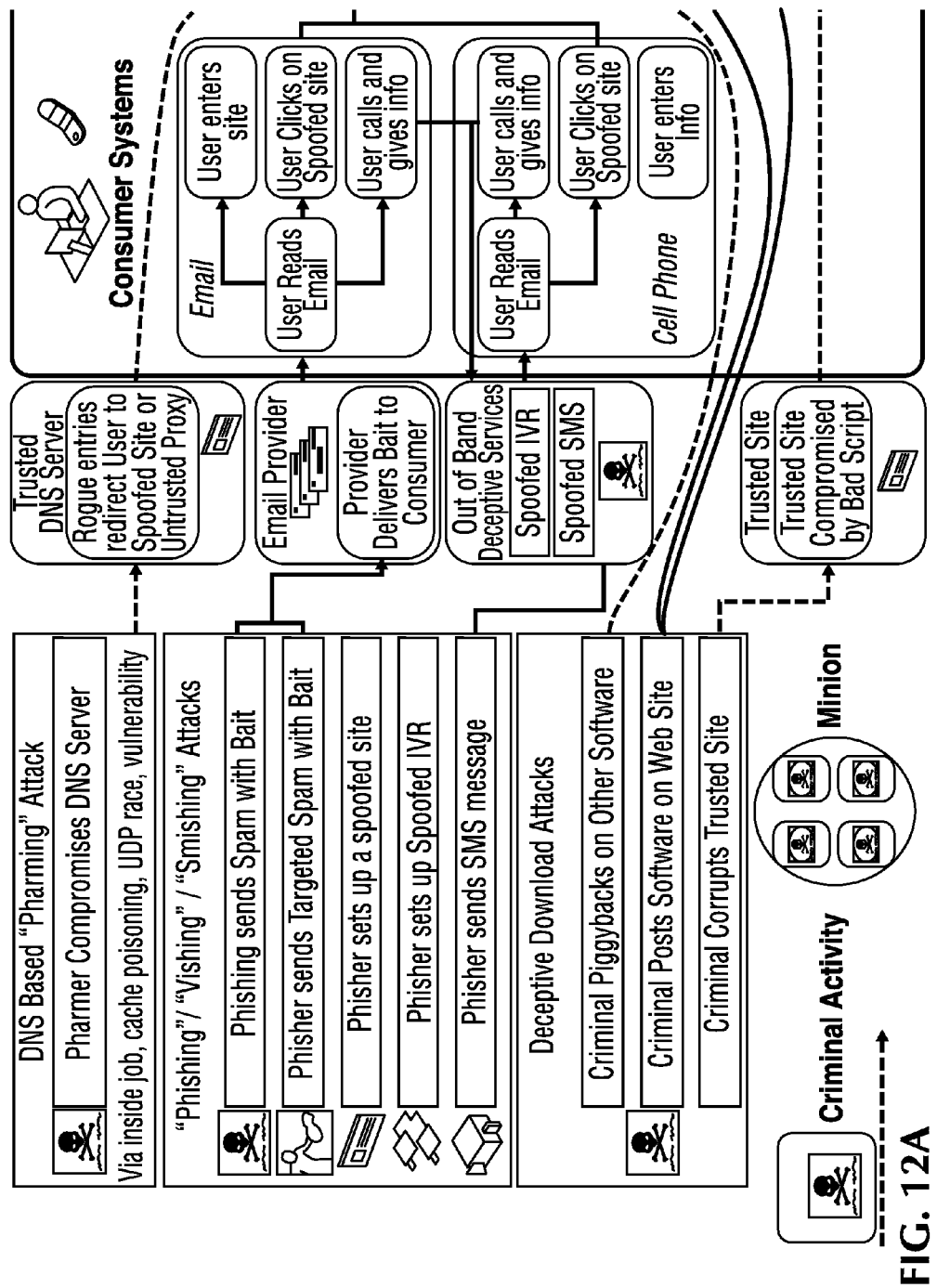
Figure 12B:
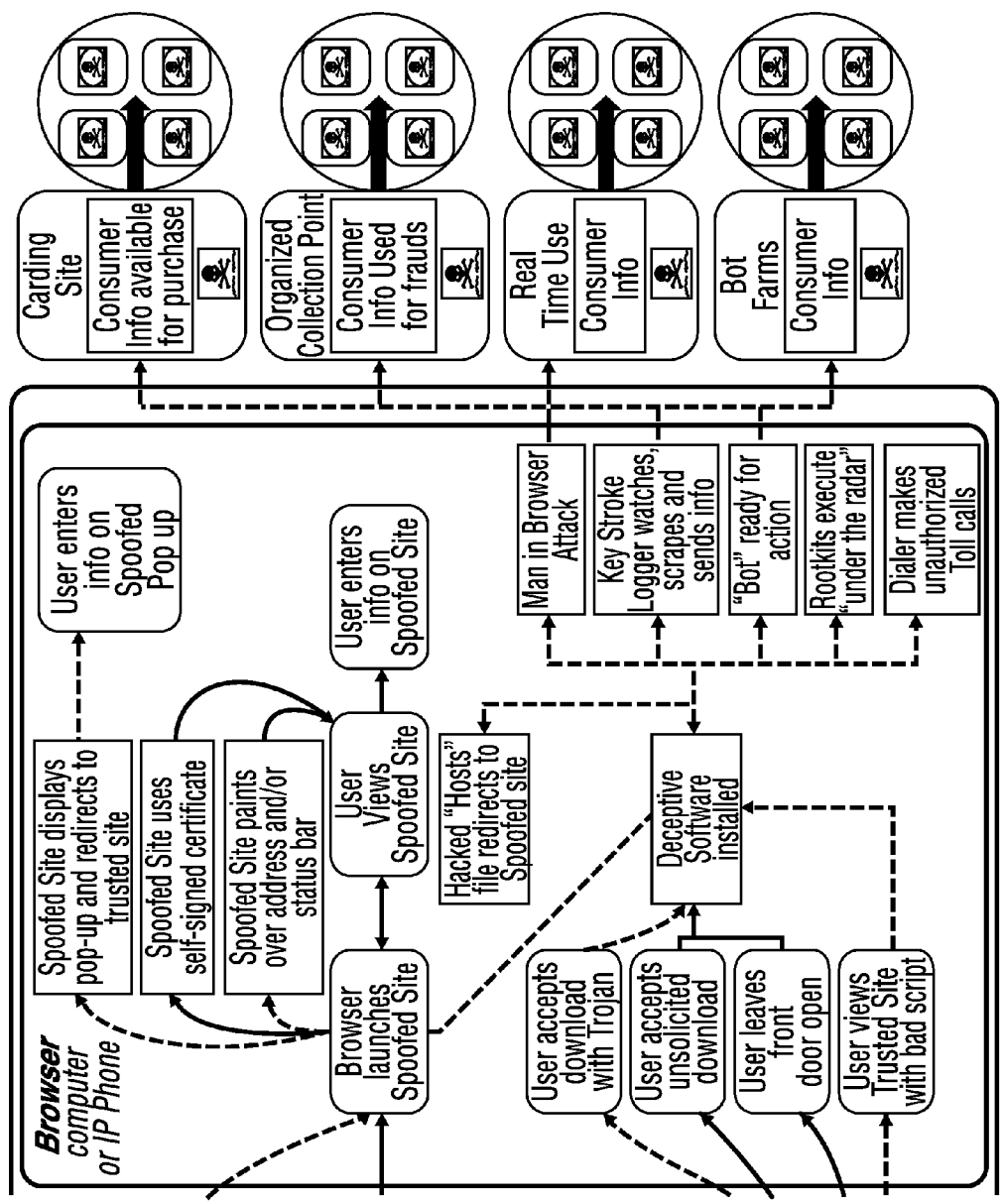
Figure 13:
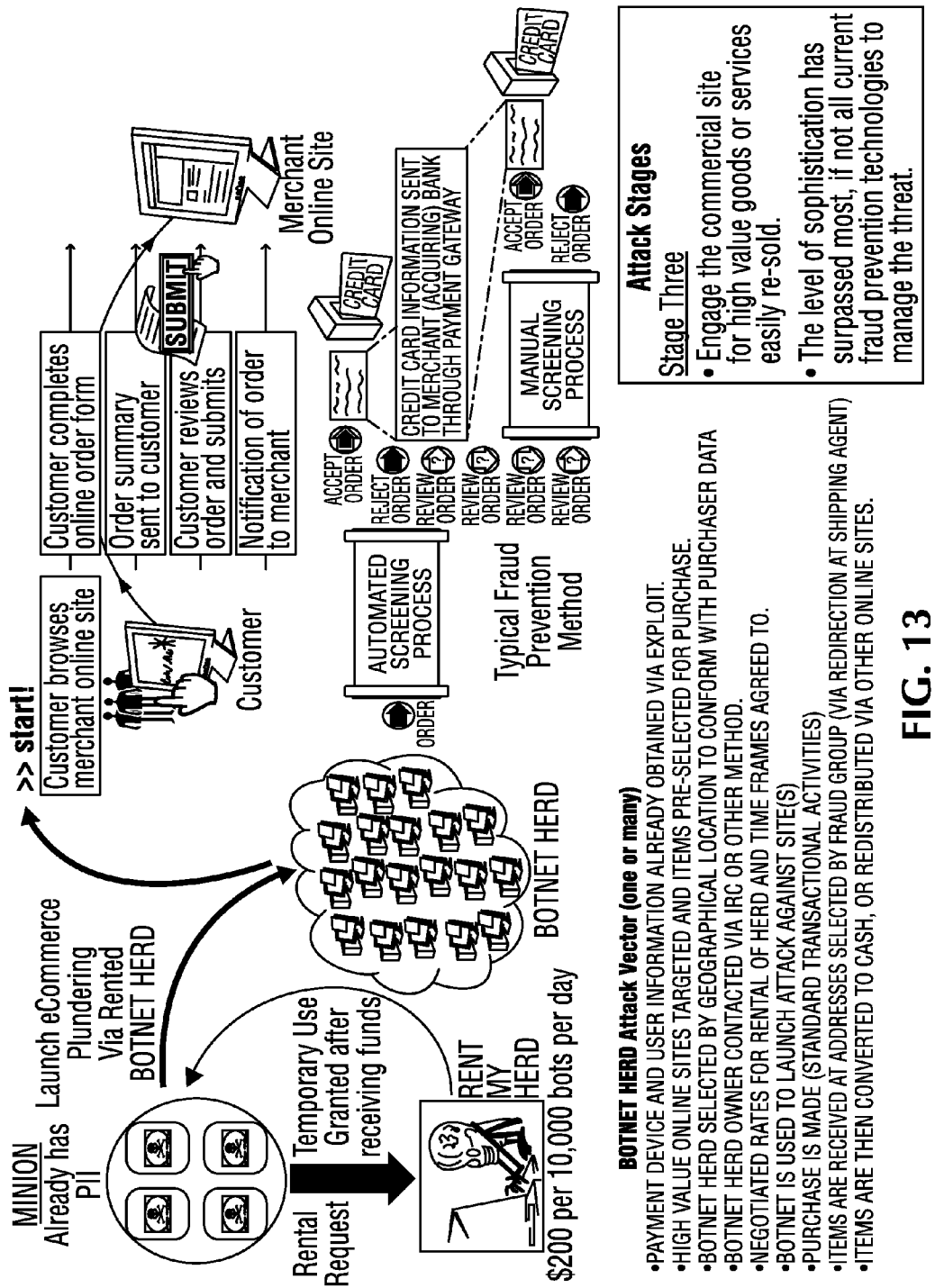
FIG. 13 provides a conceptual diagram on the prosecution of a retail fraud transactional attack using botnets.
Figure 14:
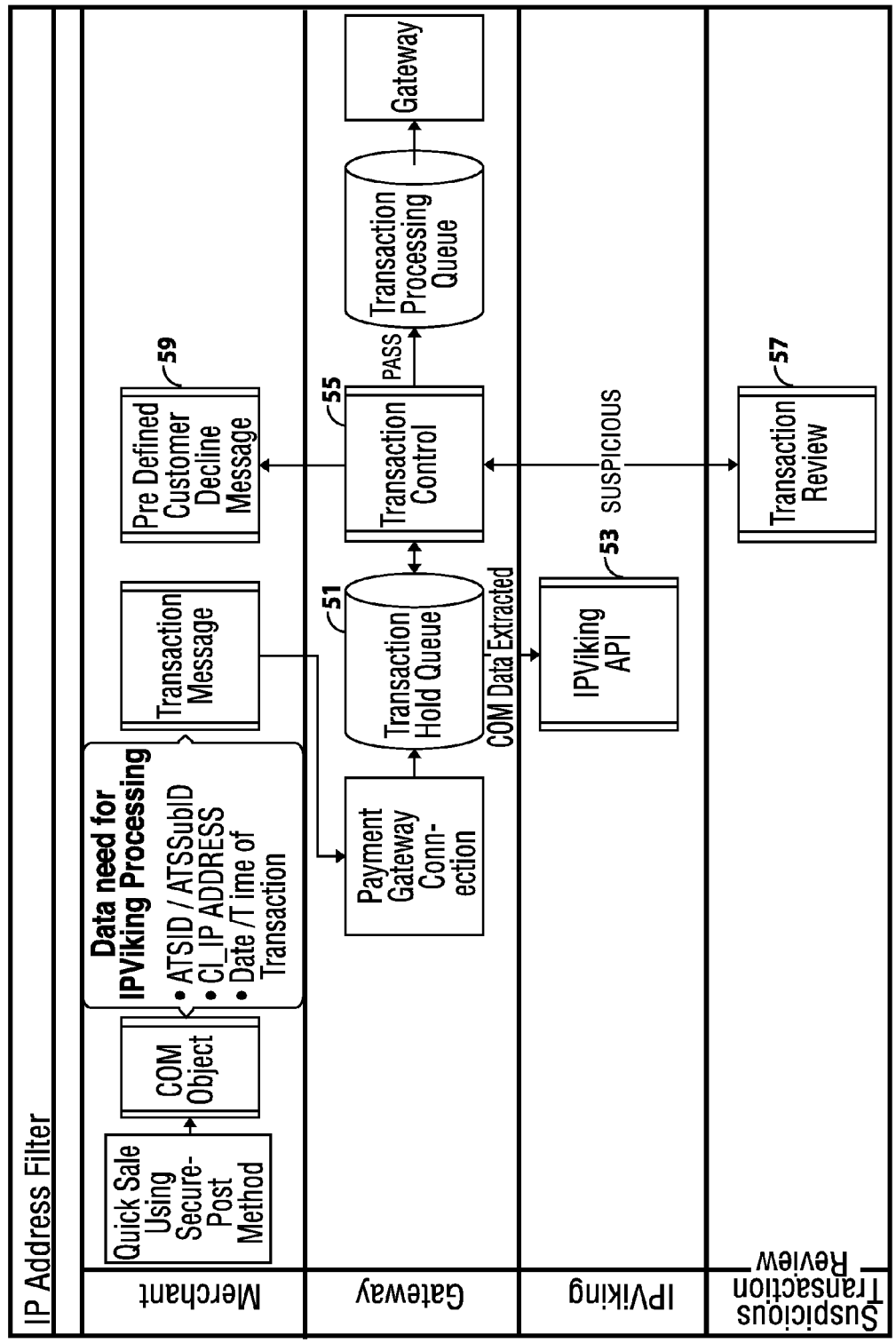
FIG. 14 provides a flowchart showing how an embodiment can be used to inhibit a fraudulent transaction and hinder the attack depicted in FIG. 13.

FIGS. 12-14 depict a fraudulent on-line transaction, and an embodiment of the present invention from the perspective of a customer or user of the embodiment in the context of preventing a fraudulent commercial transaction. FIG. 12 depicts a mechanism for obtaining personal information to carry out identify theft, and FIG. 13 depicts a fraudulent consumer transaction over a network. In the depicted embodiment of FIG. 14, a retail vendor on the Internet utilizes the systems and method of the present invention to refuse a transaction with an IP Address that is likely to be engaged in identity theft, fraud, or to otherwise present a threat to the legitimacy of an on-line sales transaction. In the depicted embodiment, the merchant has a transaction queue (51) processing sales or other transactions requested by customers over the Internet, and the merchant uses an API (53) to request security information about the IP Address associated with each proposed transaction. If the IP Address has been identified as presenting a high risk for commercial activity, the merchant then makes a business decision whether to accept or reject (59) the transaction, or to "hold" the transaction while the merchant further reviews (57) the transaction for authenticity. From the customer perspective, the IP Address is submitted to the system and the customer receives a risk score and classification data, and the specific implementation of the system itself may not be important to the customer. For example, in an embodiment, the API may contact a raw database (14), staging database (22), production database (28), or another source of data entirely.

Figure 15:
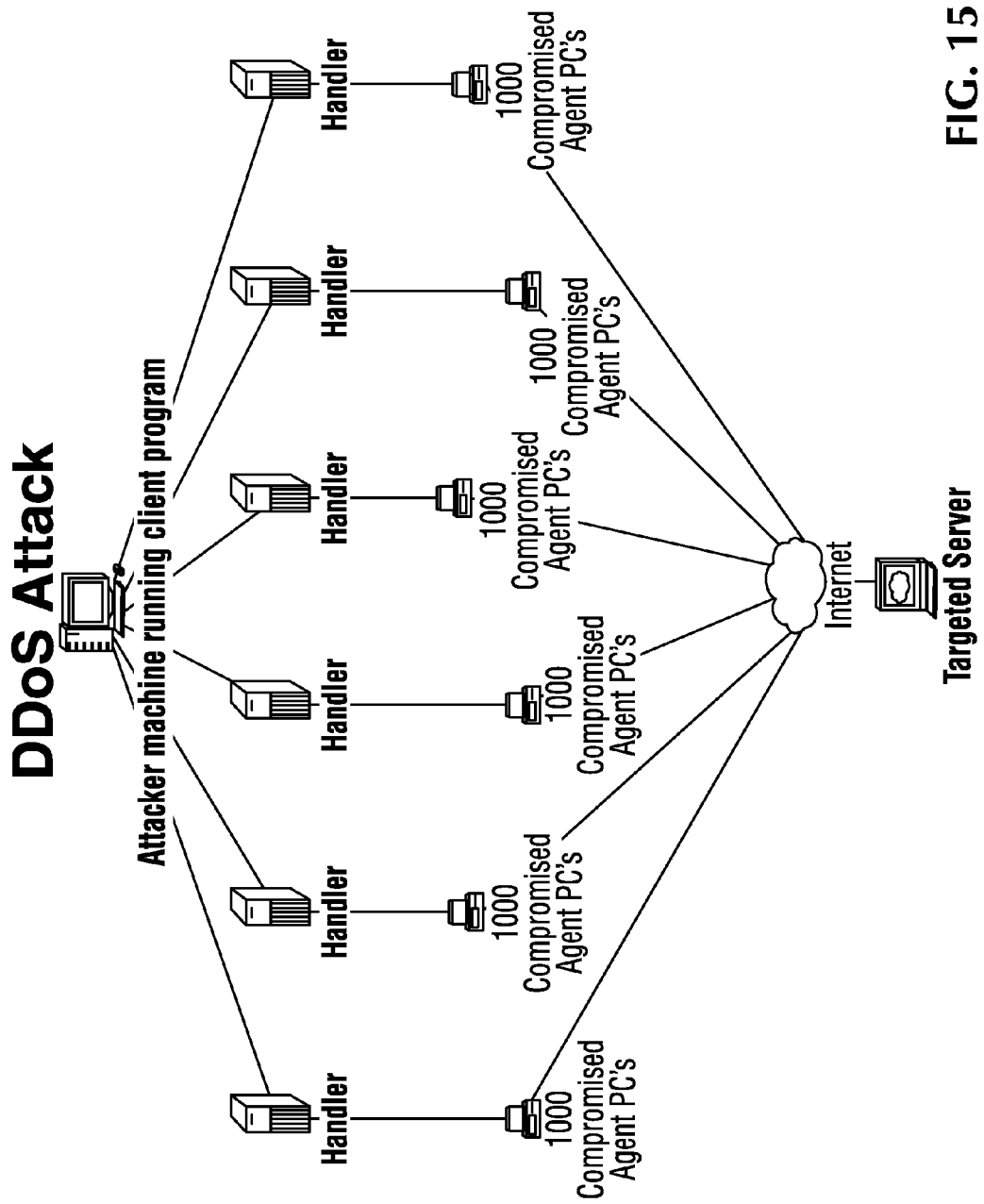
FIG. 15 shows a general block diagram illustrating how a distributed denial of service attack is carried out.
Figure 16A:
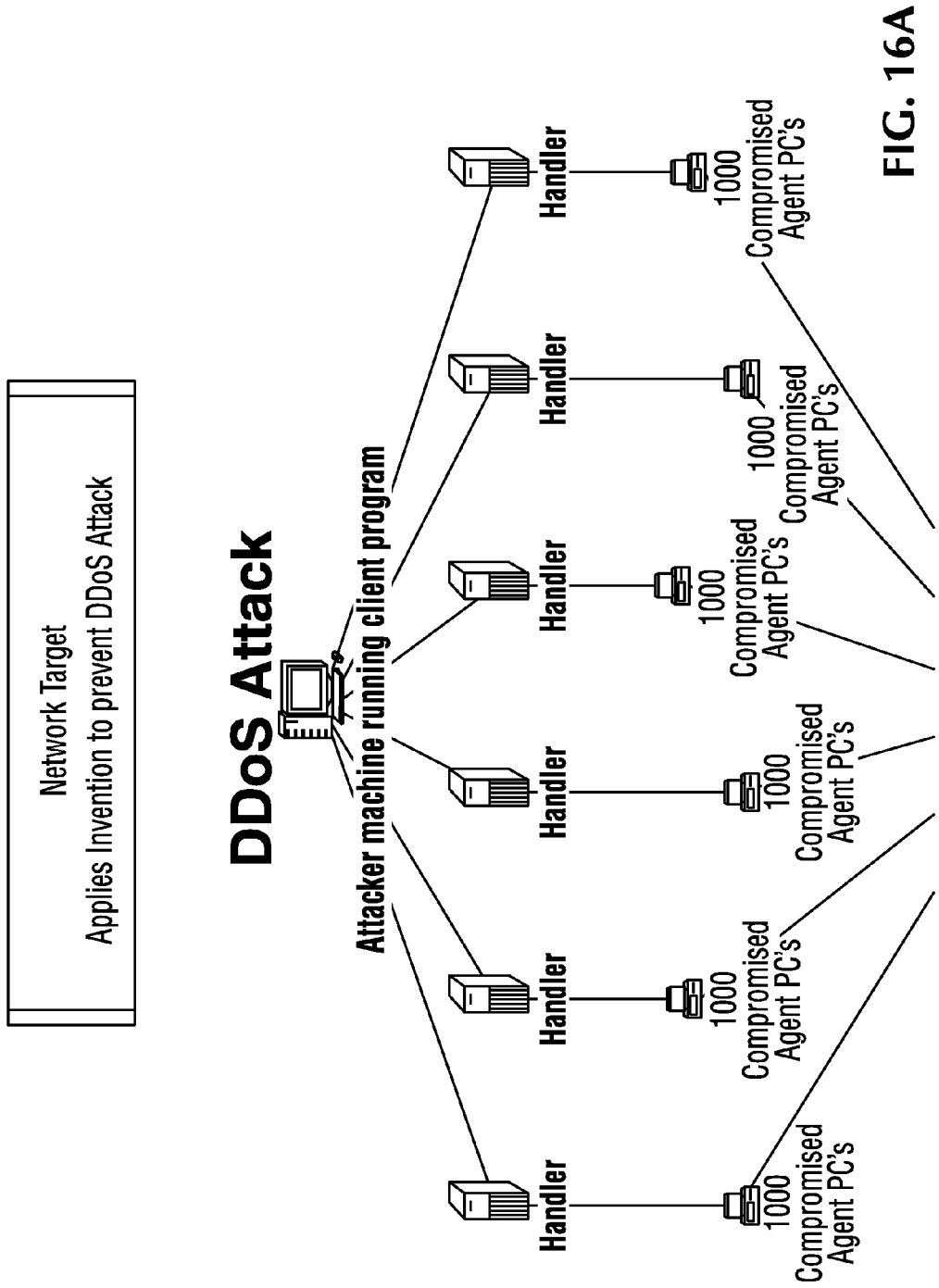
FIGS. 16A and 16B show an embodiment of a system used to inhibit the effectiveness of a distributed denial of service attack.
Figure 16B:
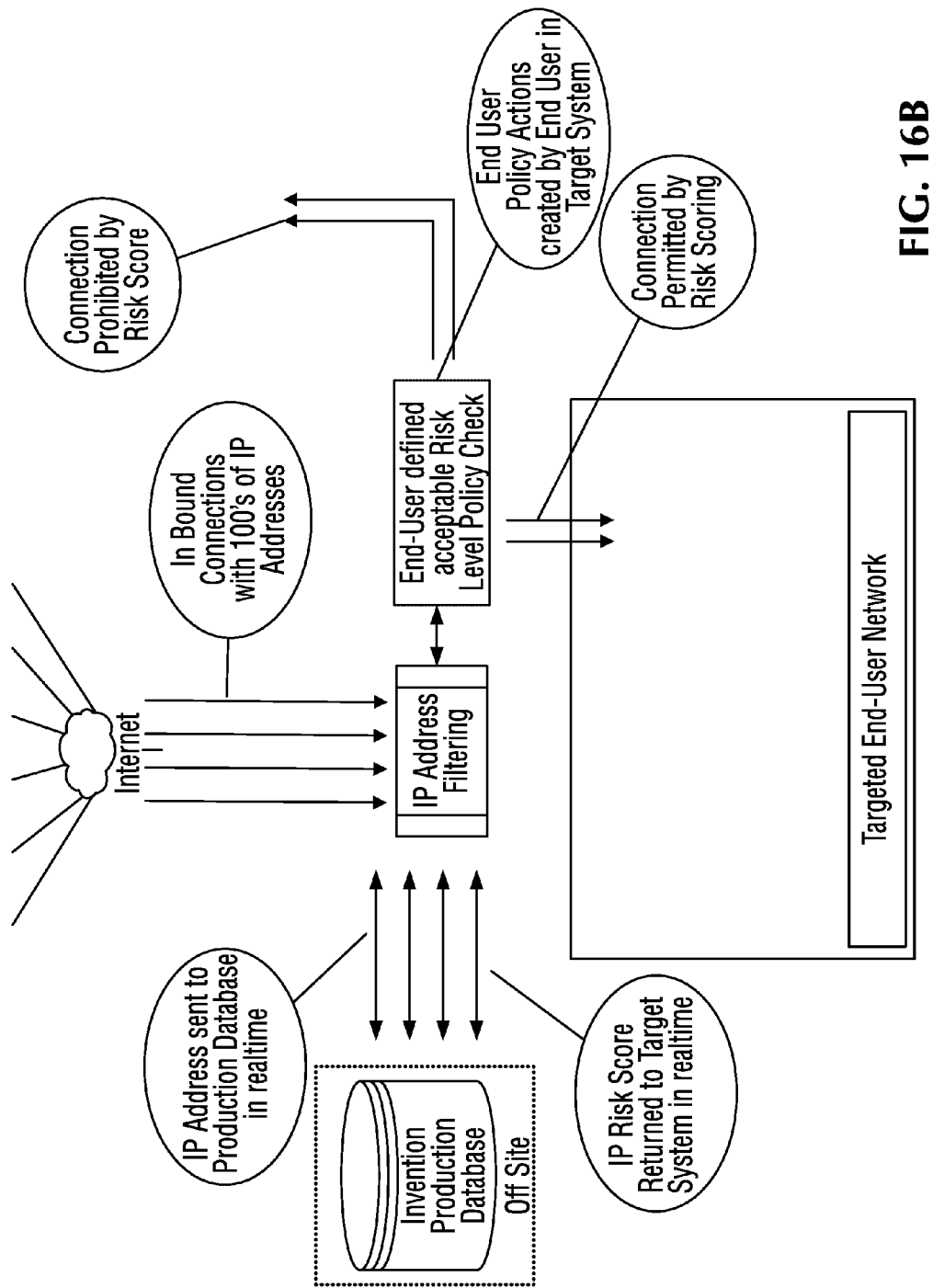

Similarly, FIGS. 15-16 depict a botnet attack and an embodiment of the present invention from the perspective of a customer or user of the embodiment in the context of counteracting a distributed denial of service attack from a botnet. The customer's interaction with the invention is similar to that depicted in FIG. 14, in that before the customer allows a proposed transaction—in this case merely accepting a network connection from the IP Address at all—the IP Address is sent to a database (28), or other data source, having data concerning IP Addresses posing botnet risk. In the depicted embodiment, the customer has defined his threshold, or "pain tolerance," for botnet attacks in advance. A large and sophisticated enterprise with advanced load balancers and large bandwidth may only wish to turn aside IP Addresses that are almost certain to be botnets. By way of example and not limitation, the customer may determine that IP Addresses with a botnet risk score of 75 or higher should be filtered out and connections prohibited. However, a smaller enterprise may have less bandwidth and less tolerance for mischief, and may determine that an IP Address presenting a botnet risk score of 40 or higher should be filtered out and the connection prohibited. While the latter case is likely to inadvertently prohibit more legitimate connections than the former, the latter case is also likely to prohibit more botnet connections than the former. If an incoming connection's IP Address has a risk in excess of the threshold, the connection is rejected entirely. The customer's ability to define these "pain tolerance" thresholds allows the present invention to be tailored to the business needs of individual customers without having to alter the embodiment itself.

The flexibility of the collection agents (10), analytical modules (18, 20), and other components of the present invention makes a potent defense against activities and behaviors which pose security risks on a computer network By receiving both the category of risk presented by the IP Address and the severity of that risk, the client has enough information to make a decision regarding how the client wishes to interact with that IP Address, if at all, and to set thresholds for interactions and responses to IP Addresses based upon the risk severity and categories. In this way, clients may determine the appropriate level of protection the client wishes to achieve, while simultaneously not overly excluding legitimate and harmless connections.

A partial and exemplary list of categories of risk activities and protocol settings is providing in FIG. 5 to this disclosure. Due to the dynamic and quick changing nature of online threats, it is impossible to list all possible threats and risk categories. As new types of risk develop, increase, or existing types of risk subside or are mitigated, new categories will necessarily be added, and old categories may be deprecated, merged, or phased out. Some of these risks are depicted in FIG. 11. Other risk activities include without limitation: infringement of intellectual property; terrorism; civil disobedience; vandalism; cyber bullying; pornography exchange; drug and other controlled substance distribution or smuggling; human trafficking; identify theft; fraud; hacking; child pornography; financial misconduct; cyber-terrorism; identify theft; cyber-stalking; arms; drugs; espionage; music piracy; games piracy; movie piracy; stocks and/or securities misconduct; information piracy; privacy violations; celebrity stalking; cyberbullying; pornography; hacking; criminal activity; organized crime; spyware; malware; phishing; gambling; violence; scams; fraud; solicitation; insider trading; or instructions or guidance on carrying out any of these types of activities. In an embodiment, risk activity is categorized by the type of activity for which the IP Address represents a threat including but not limited to the above list. In another embodiment, risk activity is categorized by the technological facets of the IP Address causing suspicious, including but not limited to: open proxies; open relays; brute force attempts; use of bogons; use of botnets; bitcoin and other virtual currency transactions; anonymizing services; use of certain open protocols including without limitation FTP, IRC, newsgroups, file sharing protocols, bittorent, Gnutella, P2P networks, and web services, particularly web services running on nonconventional ports (i.e., ports other than port 80).

It is important to note that while certain enumerated risk activities are specifically contemplated, the present invention is also specifically intended as a countermeasure against risk activities not specifically enumerated herein, including risks and threats that have not yet materialized. By its nature, the present invention is infinite and limitless in the scope of breadth of attacks that can be detected and inhibited. The absence of specific discussion or description of the use of the systems and methods disclosed herein as a countermeasure to a specific risk or threat, whether known or unknown, should not be understood as excluding said risk from the scope of the present invention. Similarly, the presence of specific discussion or description of the use of the systems and methods disclosed herein as a countermeasure to a specific risk or threat, whether known or unknown, should not be understood as excluding risks or threats not specifically discussed. Rather the present invention should be understood as detecting new and emerging sources of computer network security risk not yet known or identified.

While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

The invention claimed is:

1. A system for reducing the security risk of transactions with a computer over a computer network, said system comprising:
   a. a computer network;
   b. a first computer on said computer network, said first computer having a first computer network address and said first computer communicating with a second computer on said computer network;
   c. a communication between said first computer and said second computer, said act of said first computer communicating with said second computer being indicative of a user of said first computer being engaged in a risk activity and said communication including said first computer network address;
   d. a monitoring system on said computer network having one or more monitoring agents autonomously obtaining said first computer network address from said communication between said first computer and said second computer; and
   e. one or more algorithms assigning a risk score to transactions over said computer network from said first computer network address, said risk based at least in part on content on said second computer;
   wherein said monitoring system utilizes said risk score to inhibit a communication between said first computer and a third computer.

2. The system of claim 1, wherein said computer network is the Internet.

3. The system of claim 1, wherein said first computer network address is an Internet Protocol address.

4. The system of claim 1, wherein one or more of said one or more monitoring agents is selected from the group consisting of: a bot; a daemon; a terminate-and-stay-resident program; a honeypot; a computer; a virtual computer; a network device; a virtual network device; a spider; a P2P networking client; a P2P networking server; a packet filter; a packet sniffer; a firewall; a chat client; a chat server; a file transfer client; a file transfer server; a newsgroup reader; a newsgroup server provider; a file sharing client; a file sharing server; a web server; a web site; a web page; a translation program; a genetic algorithm; a learning algorithm; a self-replicating program; a worm; a Trojan horse.

5. The system of claim 1, wherein one or more of said one or more algorithms is selected from the group consisting of: pattern recognition; inferential algorithm; planning algorithm; heuristic algorithm; logical algorithm; search algorithm; decision tree algorithm; red-black tree algorithm; Levensthein algorithm; CacheHill algorithm; PCRE algorithm; Oliver decision graph algorithm; genetic algorithm; learning algorithm; self-teaching algorithm; self-modifying algorithm.

6. The system of claim 1, wherein said risk activity is selected from the group consisting of: fraud; identify theft; crime; cyberbullying; denial-of-service; hacking; virus authoring or distribution; exploit authoring or distribution; digital piracy; intellectual property infringement; pornography production or distribution; controlled substance trade; terrorism; insurrection; smuggling; organized crime; civil disobedience; money laundering.

7. The system of claim 1, wherein said risk score is provided through an application programming interface.

8. The system of claim 1, wherein said risk score is in the value range 0 to 100 inclusive.

9. A non-transitory computer readable media, said media comprising:
   a. computer-readable instructions for detecting a communication between a first computer and a second computer, said act of said first computer communicating with said second computer being indicative of a user of said first computer being engaged in a risk activity;
   b. computer-readable instructions for obtaining a network address from said first computer;
   c. computer-readable instructions for assigning a risk score and a risk category to said first computer network address, said risk category based at least in part on the content of said second computer;
   d. computer-readable instructions for storing said risk score and said risk category; and
   e. computer-readable instructions for utilizing said risk score and said risk category to inhibit communication between said first computer and a third computer.

10. The media of claim 9, wherein said first computer network address is an Internet Protocol address.

11. The media of claim 9, wherein said risk category is selected from the group consisting of: commercial risk; fraud risk; identify theft risk; criminal risk; social risk; denial-of-service risk; hacking risk; virus risk; exploit risk; infringement risk; pornography risk; drug risk; terrorism risk.

12. The media of claim 9, wherein said risk score is in the value range 0 to 100 inclusive.

* * * * *